United States Patent
Hurt et al.

(10) Patent No.: US 11,250,184 B2
(45) Date of Patent: Feb. 15, 2022

(54) 3D TOLERANCE ANALYSIS SYSTEM AND METHODS

(71) Applicant: Enventive Engineering, Inc., South Lancaster, MA (US)

(72) Inventors: James Hurt, South Lancaster, MA (US); Ralph A. Gifford, South Lancaster, MA (US); A. Vincent Huffaker, South Lancaster, MA (US); Kurt Andersen, South Lancaster, MA (US)

(73) Assignee: ENVENTIVE ENGINEERING, INC., South Lancaster, MA (US)

( * ) Notice: Subject to any disclaimer, the term of this patent is extended or adjusted under 35 U.S.C. 154(b) by 662 days.

(21) Appl. No.: 16/170,008

(22) Filed: Oct. 24, 2018

(65) Prior Publication Data

US 2019/0121925 A1    Apr. 25, 2019

Related U.S. Application Data

(60) Provisional application No. 62/576,405, filed on Oct. 24, 2017.

(51) Int. Cl.
*G06F 30/20* (2020.01)
*G06F 30/17* (2020.01)
(Continued)

(52) U.S. Cl.
CPC ............ *G06F 30/20* (2020.01); *G06F 30/17* (2020.01); *G06F 2111/04* (2020.01); *G06F 2117/02* (2020.01); *G06F 2119/18* (2020.01)

(58) Field of Classification Search
CPC ...... G06F 30/20; G06F 30/17; G06F 2111/04; G06F 2111/02; G06F 2119/18
See application file for complete search history.

(56) References Cited

U.S. PATENT DOCUMENTS 5,617,510 A    4/1997   Keyrouz et al.
5,831,875 A    11/1998  Hirata et al.
(Continued)

OTHER PUBLICATIONS

Li et al. "Relative positioning of tolerance polyhedral parts in an assembly". IIE transactions, Apr. 1, 2001, vol. 33 (4), p. 323-336. (Year: 2001).*

(Continued)

*Primary Examiner* — Eunhee Kim
(74) *Attorney, Agent, or Firm* — Hamilton, Brook, Smith & Reynolds, P.C.

(57) ABSTRACT

A computer-aided design system provides tolerance analysis of model assemblies. Constraints are applied to a model assembly based on user-selected surfaces. Overlay surfaces are defined at the assembly, where each of the overlay surfaces corresponds to a user-selected surface. One or more stacks are defined based on a user input, where the stacks are a measurement dimension encompassing two or more parts of the assembly. The system simulates 1) variation of the overlay surfaces across a range of variation values within a respective tolerance zone based on the tolerance specifications, and 2) alteration of the stack as a result of the variation. Based on the variation of the overlay surfaces, the system identifies a subset of the user-selected surfaces that, when varied within the respective tolerance zone, alter the stack. A database is configured to indicate 1) the user-selected surfaces and 2) respective contributor values indicating a relative contribution of each of the user-selected surfaces to the stack.

38 Claims, 32 Drawing Sheets

(51) Int. Cl.
*G06F 111/04* (2020.01)
*G06F 117/02* (2020.01)
*G06F 119/18* (2020.01)

(56) References Cited

U.S. PATENT DOCUMENTS

| | | | |
|---|---|---|---|
| 5,867,397 | A | 2/1999 | Koza et al. |
| 6,333,749 | B1 | 12/2001 | Reinhardt et al. |
| 6,377,263 | B1 | 4/2002 | Falacara et al. |
| 6,433,776 | B1 | 8/2002 | Todd |
| 6,889,113 | B2 | 5/2005 | Tasker et al. |
| 6,947,037 | B1 | 9/2005 | Lynn et al. |
| 6,963,824 | B1 * | 11/2005 | Davidson ............... G06F 30/00 703/2 |
| 7,233,341 | B1 | 6/2007 | Sauerbrei |
| 7,623,139 | B1 | 11/2009 | Gifford et al. |
| 7,639,267 | B1 | 12/2009 | Desimone et al. |
| 7,969,435 | B1 | 6/2011 | DeSimone et al. |
| 8,793,097 | B2 * | 7/2014 | Sheehan ............... G06T 19/00 702/123 |
| 9,384,591 | B2 | 7/2016 | Hurt et al. |
| 2002/0128810 | A1 * | 9/2002 | Craig ............... G05B 19/41805 703/17 |
| 2002/0143507 | A1 | 10/2002 | Lu et al. |
| 2003/0149498 | A1 | 8/2003 | Rebello et al. |
| 2003/0149502 | A1 | 8/2003 | Rebello et al. |
| 2003/0182311 | A1 | 9/2003 | Nakajima et al. |
| 2003/0187879 | A1 | 10/2003 | Tamaru et al. |
| 2004/0090439 | A1 | 5/2004 | Dillner |
| 2005/0071042 | A1 | 3/2005 | Subrahmanyam et al. |
| 2006/0106476 | A1 * | 5/2006 | Tornquist ........... G05B 19/4097 700/98 |
| 2010/0298967 | A1 | 11/2010 | Frisken et al. |
| 2012/0069011 | A1 * | 3/2012 | Hurt ....................... G06T 19/00 345/419 |
| 2018/0181691 | A1 | 6/2018 | Pedersen et al. |

OTHER PUBLICATIONS

Jbira et al. "CAD/Tolerancing integration: Mechanical assembly with form defects". Advances in Engineering Software 114 (2017) 312-324. (Year: 2017).*
Li et al. "Positioning of Toleranced Parts in a 2-D Polygonal Assembly and its Use in Tolerance Analysis". IEEE Transactions on Robotics and Automation, vol. 17, No. 3, Jun. 2001. pp. 357-360. (Year: 2001).*
Schleich et al. "Evaluation of geometric tolerances and generation of variational part representatives for tolerance analysis". DOI 10.1007/s00170-015-6886-8. Int J Adv Manuf Technol (2015) 79:959-983/ (Year: 2015).*
Owen, John C. "Algebraic solution for geometry from dimensional constraints." Proceedings of the first ACM symposium on Solid modeling foundations and CAD/CAM applications. ACM, 1991 (11 pages).
Robison, Richard Hooper. A practical method for three-dimensional tolerance analysis using a solid modeler. Diss. Brigham Young University. Department of Mechanical Engineering., 1989 (162 pages).
"Focus on Electrical/Mechanical and Computer/Software-related Claims." Examination Guidance and Training Materials. USPTO, Jul. 2015. Web. Aug. 20, 2015. (31 pages).
Alvarado, "A Natural Sketching Environment: Bringing the Computer into Early Stages of Mechanical Design", MIT, May 2000, pp. 1-104.
Bo et al. "A comparison of tolerance analysis modes for assembly". DOI 10.1007/s00170-013-4795-2. Int J Adv Manuf Technol (2013) 68:739-754. (Year: 2013).
Shah et al. "Computer Modeling of Geometric Variations in Mechanical Parts and Assemblies". [DOI: 10.1115/1.1572177]. Journal of Computing and Information Science in Engineering. vol. 3, Mar. 2003. pp. 54-63. (Year: 2003).
Ghali et al. "A CAD method for tolerance allocation considering manufacturing difficulty based on FMECA tool". DOI 10.1007/s00170-016-9961-x. IntJ Adv Manuf Technol (2017) 91:2435-2446. (Year: 2017).

* cited by examiner

Figure 2: Edge View

Figure 5: Tolerance Zone for $\alpha$ and $\beta$

3D TOLERANCE ANALYSIS SYSTEM AND METHODS

RELATED APPLICATION

This application claims the benefit of U.S. Provisional Application No. 62/576,405, filed on Oct. 24, 2017. The entire teachings of the above application are incorporated herein by reference.

BACKGROUND

Typical approaches to product development, from design to manufacture, involve the use of computer-aided design (CAD) tools to define the geometry of a product and simulate the performance of a product. The product may include several components that must function in concert with one another. However, during manufacture, some of those components may be nonconforming, failing to match the specifications defined by the design. A disposition is a decision during a manufacturing process that determines how a nonconforming component will be used, or whether it must be discarded. Disposition can include changing specifications of the design to match the as-manufactured condition.

Because time and cost constraints require rapid disposition decisions, manufacturers have relied on historical experience coupled with improvised handwork solutions and luck. Lacking the type of data generated by example embodiments, disposition decisions may be inaccurate or inconsistent. Recalls, warranty repairs, product failures, and excess scrap are the casualties of disposition decisions where the gamble fails to pay off.

SUMMARY

Example embodiments provide a method that may be implemented in a computer-aided design system to provide tolerance analysis of model assemblies. A model assembly is provided within a simulated environment, the assembly including a plurality of parts. User-selected surfaces of the model assembly may be identified, and tolerance specifications for each of the user-selected surfaces may be defined. A plurality of constraints may be applied to the assembly based on the user-selected surfaces, where each of the plurality of constraints defining a relationship between surfaces of at least two of the plurality of parts. Overlay surfaces may be defined at the assembly, where each of the overlay surfaces corresponding to a respective surface of the constraints. One or more stacks may be defined based on a user input, the stacks being a measurement dimension encompassing at least two of the plurality of parts. The system may then simulate 1) variation of the overlay surfaces across a range of variation values within a respective tolerance zone based on the tolerance specifications and 2) alteration of the stack as a result of the variation. Based on the variation of the overlay surfaces, the system may identify a subset of the user-selected surfaces that, when varied within the respective tolerance zone, alter the stack. A database can then be configured to indicate 1) the user-selected surfaces and 2) respective contributor values indicating a relative contribution of each of the user-selected surfaces to the stack.

Each of the overlay surfaces may exhibit a position within the assembly equivalent to a position of the respective one of the user-selected surfaces. Each of the overlay surfaces may also exhibit a geometry equivalent to a geometry of the respective one of the user-selected surfaces, the geometry including the respective tolerances. Each of the plurality of constraints may define a relationship between at least two of the overlay surfaces. Each of the overlay surfaces may be constrained to at least one other of the overlay surfaces as a function of at least one of the plurality of constraints.

Simulating the variation may include 1) generating one of the overlay surfaces for each surface of the constraints, 2) positioning the overlay surface at the assembly, and 3) altering at least one of size, position, offset and orientation of the overlay surface. The overlay surfaces may include a planar surface, and wherein the altering includes altering at least one of offset and orientation of the planar surface. The overlay surfaces may include a cylindrical surface, and wherein the altering includes altering at least one of size and position of the planar surface.

The system may further determine a function relating 1) the stack, 2) the user-selected surfaces, 3) the plurality of constraints, and 4) the respective tolerance. The user-selected surfaces may include at least two surfaces in contact with one another between the at least two of the plurality of parts. The system may further configure the database to indicate a relation between a variation type and the respective contributor value, the variation type including at least one of size, position, offset and orientation. Based on the simulation, the system may further determine a modification to a respective tolerance value that maintains the stack within a threshold range of values. The system may further update the simulation based on the modification to the respective tolerance value, and may modify the model assembly to incorporate the modification to the respective tolerance value.

The system may further simulate movement of the assembly through at least one degree of freedom permitted via the plurality of constraints, and may identify the subset of the user-selected surfaces based on the movement.

The system may further apply a datum to at least one of the user-selected surfaces, where the datum establishes a reference point for the user-selected surfaces. Simulating the variation may include expressing the user-selected surfaces as coordinates based on the datum.

The system may further represent a plurality of surfaces of the assembly with the overlay surfaces. Each of the overlay surfaces may be defined by a mathematical rule encompassing an infinity of points.

In further embodiments, the system may apply a user-selected datum to at least one of the user-selected surfaces, the datum establishing a reference point for the user-selected surfaces. The system may further simulate 1) variation of the user-selected surfaces across a range of variation values within a respective tolerance, the variation being a function of the datum, and 2) alteration of the stack as a result of the variation. Based on this simulation, the system may configure a database to indicate 1) the user-selected surfaces, 2) the datum, and 3) respective contributor values indicating a relative contribution of each of the user-selected surfaces to the stack.

In still further embodiments, a system may apply constraints to respective surfaces of the assembly, each of the constraints including a surface definition governing variation of the respective surfaces within respective tolerance limits. The system may then define overlay surfaces for each of the constraints, each of the overlay surfaces having a geometry defined by the respective surface definition.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

DETAILED DESCRIPTION

Figure 1:
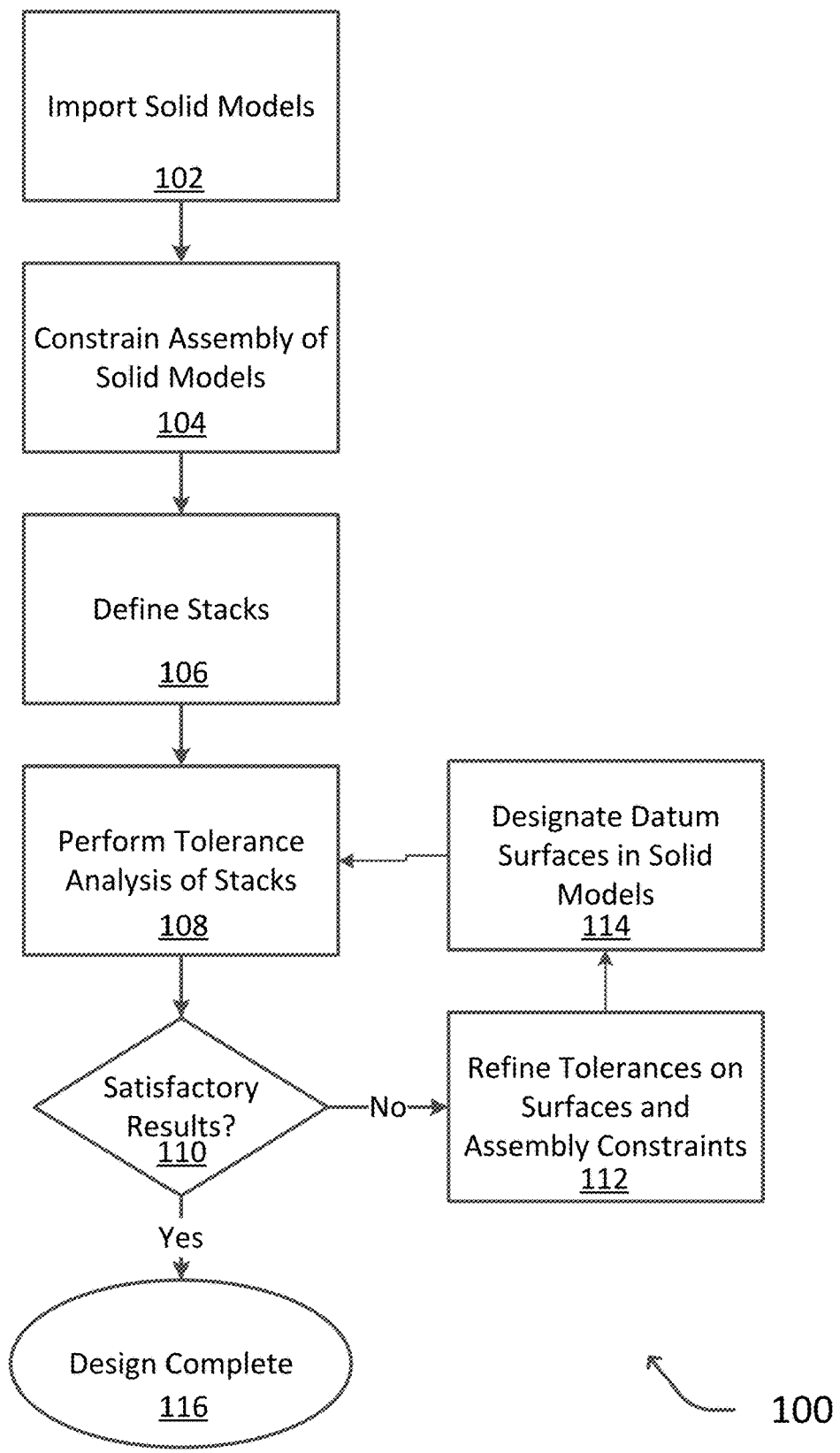
FIG. 1 is a flow diagram of a process of analyzing a model assembly in an example embodiment.

A description of example embodiments follows.

Embodiments of the present invention relate to computer-aided design (CAD) and associated methods and systems for designing, modeling and simulating objects in 3D. More particularly, embodiments relate to the technical fields of 3D Variational Design and 3D Conceptual Design, 3D Force Analysis, and 3D Tolerance and Variation Analysis.

Glossary of Terms

Constraint Server (CS): A CS is computer software code used to solve and maintain mathematical and/or geometric relationships (e.g., y constrained equal to 2 times x, lines constrained to be parallel or perpendicular, a line constrained tangent to a circle). Examples of Constraint Servers are described in U.S. Pat. Nos. 7,623,139, 9,384,591, and U.S. patent application Ser. No. 16/147,315, filed Sep. 28, 2018, the entirety of which are incorporated herein by reference.

Stack: A stack is a derived property of a manufactured product that is critical to the quality and performance of the product but cannot be directly controlled by manufacturing because it is the cumulative effect of properties (e.g., dimensional specifications) that are controlled by manufacturing. Stacks are evaluated via a tolerance analysis process to determine the range of values (the Stack variation) that may result from the cumulative variation of the Stack contributors. Typically, a Stack is a 3D dimension that measures some characteristic such as a gap between two surfaces on which the user wishes to perform tolerance analysis.

Contributor: A contributor is a manufacturing-controlled property (e.g., a dimensional specification) that may vary within tolerance specification limits, and combined with other contributors produces Stack variation results. Contributors are typically defined with nominal values and upper and lower tolerances.

Tolerance Specification: A specification on a contributor that limits how much the geometry of this contributor is allowed to vary.

Tolerance Analysis: The process of determining how a stack (or stacks) vary as the contributors vary within their tolerance specifications.

Global Coordinate System: The coordinate system used to describe geometry in a part. Each Global Coordinate System has six degrees of freedom, three for position and three for orientation.

Basic Surface: Any surface of a CAD model containing an infinity of points and bounded by trimming curves.

Feature Control Frame: As commonly understood in the field of geometric dimensioning and tolerancing.

Datum Reference Frame: As commonly understood in the field of geometric dimensioning and tolerancing.

Datum Surface: A basic surface used to determine the position and/or orientation of a datum reference frame for the part.

Variational Surface: A surface (infinity of points) that is created to overlay a basic surface. Each Variational Surface is designed to allow variations from the Basic Surface. Variations from the basic surface are limited by tolerance specifications.

Mating Constraint: A geometric relationship between two or more basic surfaces on two or more parts. For example, a mating planes constraint acts between two planar surfaces, one on each of two different parts, orienting the parts so that the planes are aligned with each other. Another example, a pin in hole constraint acts between two cylindrical features, a pin on one part and a hole on another part, orienting the parts so that the pin is fit into the hole.

Surface Definition: A set of one or more mathematical equations that are satisfied by the coordinates of its points, and bounded by trimming curves.

Example embodiments provide a system and method for rapidly analyzing the variation of a Stack, when the Contributors are variations of basic surfaces of the underlying solid models. This analysis can be completed by such embodiments using the geometry of each part, without any further information required about the solid models. Example solutions may not require knowledge of the internal constraints of each part, or how each part was constrained.

FIG. 1 is a flow diagram of a process 100 of analyzing a model assembly in an example embodiment. When utilizing a system in such an embodiment, the system may import the basic surface geometry for each part in an assembly from a CAD model, based on a user selection (102). This import operation may use any standard file format such as I-GES, STEP, Parasolid, or it may use a CAD system specific method of importing the CAD model. The nominal geometry for each part may be imported as a rigid body, with undefined internal constraints such that the nominal position, orientation, and size of each basic surface cannot move relative to the positions, orientations, and sizes of all the other surfaces in the part.

Once the solid models have been imported, the system may then constrain the assembly based on user input (104). For example, the user may ground one part to prevent it from moving. That one part then becomes the base part of the assembly. As additional parts are imported, the user may add mating constraints to the assembly model. The system may then define stacks according to user input, where each stack is a measurement dimension encompassing two or more parts of the assembly (106). Once the assembly is fully constrained, the user can add one or more stacks to the model. The users may also specify overall default tolerances to enable rapid tolerance analysis with an initial tolerance specification assumption.

Under the properties defined above, the system may then perform a tolerance analysis of the assembly, determining a relation between variation of the parts and the stacks (108).

The system may compute the variation of the stacks given the basic surfaces, the assembly constraints, the tolerances for each part, and the datum information for each part. In response to user input that changes any of those properties, the system can update the stack variation. If the results of the analysis are not satisfactory (110), then the tolerances of each part or dimension may be revised or refined as necessary to achieve the functional goals necessary for product reliability (112). Further, datum surfaces may be assigned or reassigned as needed to achieve such goals (114). For example, the user may select a surface of a part and observe the impact upon a stack of making that surface a primary, secondary, or tertiary datum. Certain surfaces could reduce the Stack variation if they were datum surfaces. The tolerance analysis (108), tolerance refinement (112) and datum assignment (114) may be repeated as necessary to provide an assembly meeting the given design goals and performance requirements, resulting in a completed design (116).

Tolerance Analysis

Each basic surface of a part may be allowed to vary from its nominal position, orientation, and size within the limits implied by the tolerance specification on that surface. The user can then select one or more Stacks and perform tolerance analysis thereon to compute the contribution of that basic surface to the Stack variation.

The first major step in performing a tolerance analysis is to perform a sensitivity analysis of the stacks. A sensitivity analysis of a stack is the process of computing the partial derivative of that stack with respect to each mating constraint. The sensitivity analysis provides an approximation of the functional relationship between each stack and each contributing mating constraint. The second major step in performing a tolerance analysis is for each mating constraint to automatically create an appropriate Variational Surface (i.e., an infinity of points\ overlaying the basic surface) for each basic surface involved in the mating constraint.

The final major step in performing a tolerance analysis is to use the approximate functional relationship to compute how the value of each stack can vary as the Variational Surfaces of the mating constraint perturb within the tolerance specifications and how the mating constraints themselves perturb within their mating conditions. Perturbing a surface may be understood as temporarily adjusting the variation of the Variational Surface from the basic surface. Perturbing a mating constraint may be understood as temporarily adjusting the relationship between the Variational Surfaces involved (e.g. a pin that is not perfectly aligned with the hole). Any such variation will cause the various parts to adjust position and orientation (i.e., the parts will move in the assembly) in order to maintain the relationships determined by the mating constraints and will affect the values of the stacks.

During tolerance analysis, two types of variation of the stack may be computed: worst case and statistical. Worst case variation is the computation of the upper and lower limits of the stack value as the surfaces and constraints vary within their tolerance specifications. Statistical variation is the computation of statistical properties of the stack value as the surfaces and constraints vary randomly within their tolerance specifications. Furthermore, example embodiments can distinguish different types of variation of the basic surfaces, depending on the surface type. For example, variations of planar surfaces can be separated into offset variation and orientation variation, and variations of cylindrical surfaces variation can be separated into position variation and size variation.

Example Assembly Analysis

An example process of analyzing and revising an assembly is described below with reference to FIGS. 2-23.

Figure 2:
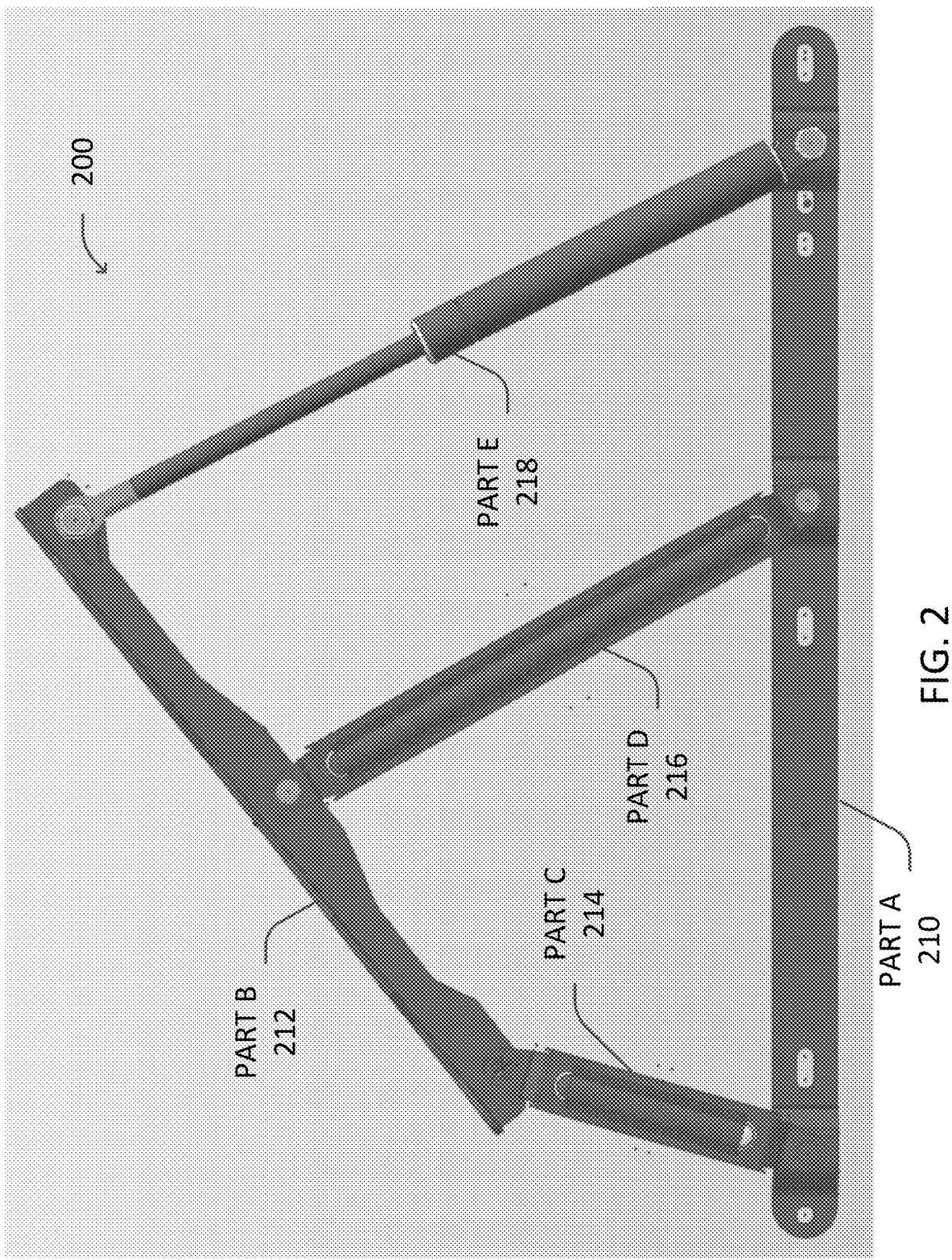
FIG. 2 illustrates an example engineering model of a mechanical assembly implemented in one embodiment.

FIG. 2 illustrates an engineering model of a mechanical assembly 200 that may be implemented in the example analysis process described below. The model assembly 200 includes a plurality of parts 212-218, as well as model pins and screws positioned to bind the parts together. To perform an analysis of the assembly 200, a system in an example embodiment may first import the basic surface geometry for each part in the assembly 200 from a CAD model. This import operation may use any standard file format such as I-GES, STEP, Parasolid, or it may use a CAD system specific method of importing the CAD model. The nominal geometry for each part may be imported is a rigid body, with undefined internal constraints such that the nominal position, orientation, and size of each basic surface cannot move relative to the positions, orientations, and sizes of all the other surfaces in the part.

Figure 3:
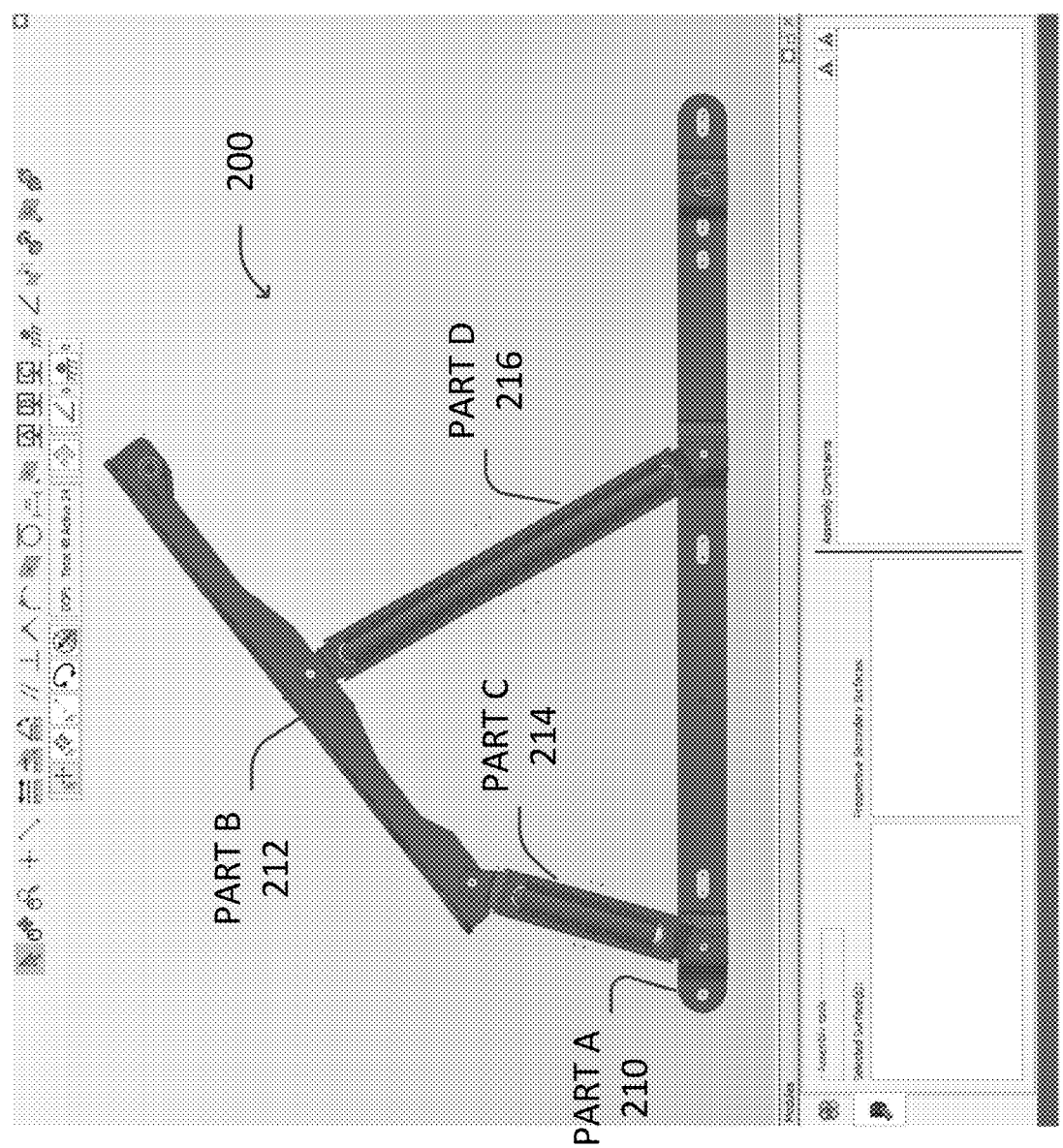
FIGS. 3-21 illustrate portions of an example user interface and corresponding diagrams associated with an analysis process in an example embodiment.

FIGS. 3-23 illustrate portions of an example user interface of a software application that can be displayed during an analysis process in an example embodiment, as well as diagrams illustrating operations underlying the process. As shown in FIG. 3, the assembly 200 is imported into the system, and may be simplified by removing components unnecessary for analysis. In particular, part E 218 may be removed and replaced by a dimension, and the pins and screws binding the remaining parts 210-216 are removed. The parts 210-216 may instead be constrained by a set of constraints applied to the assembly 200 within the system.

Figure 4:
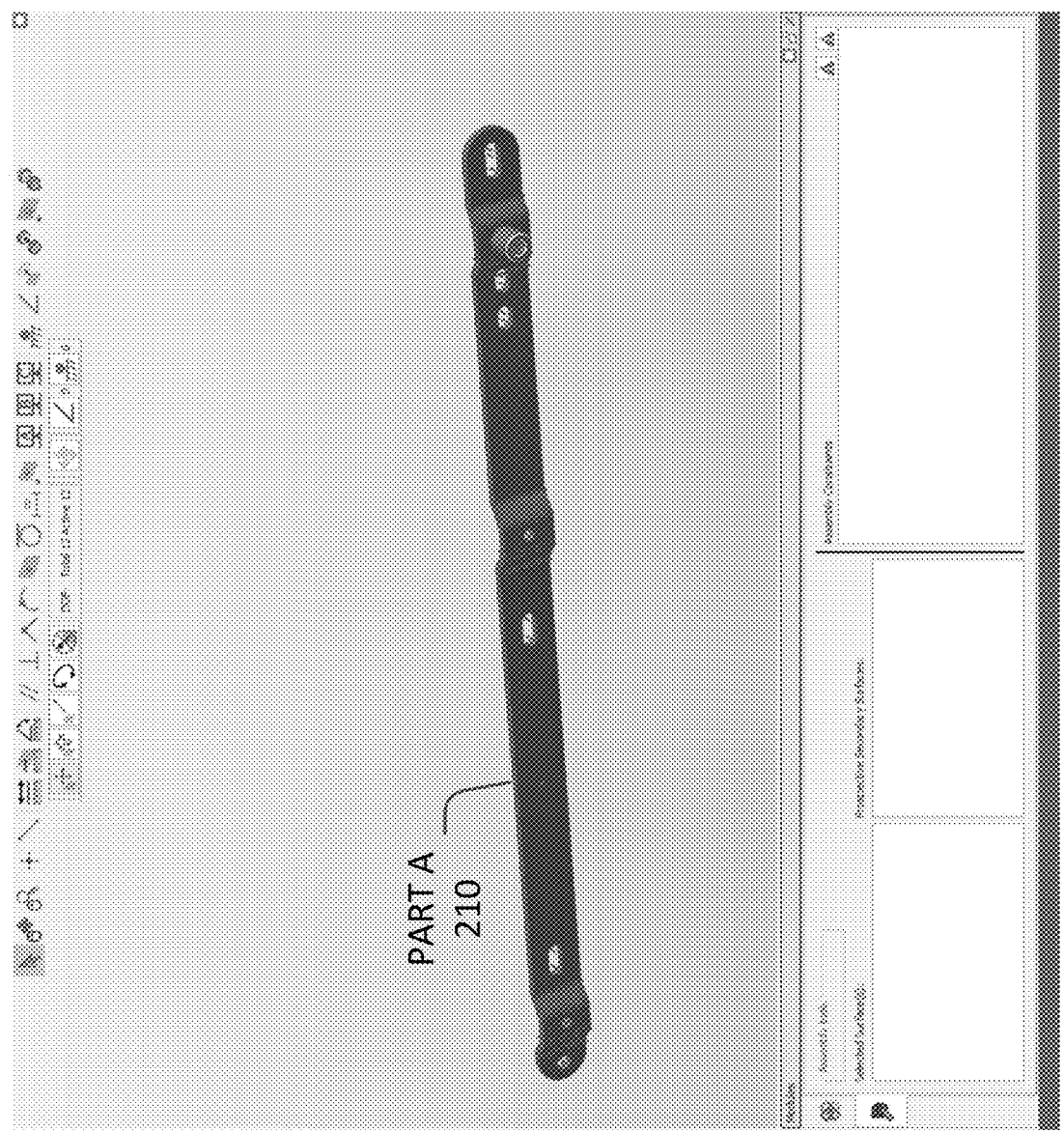
Figure 5:
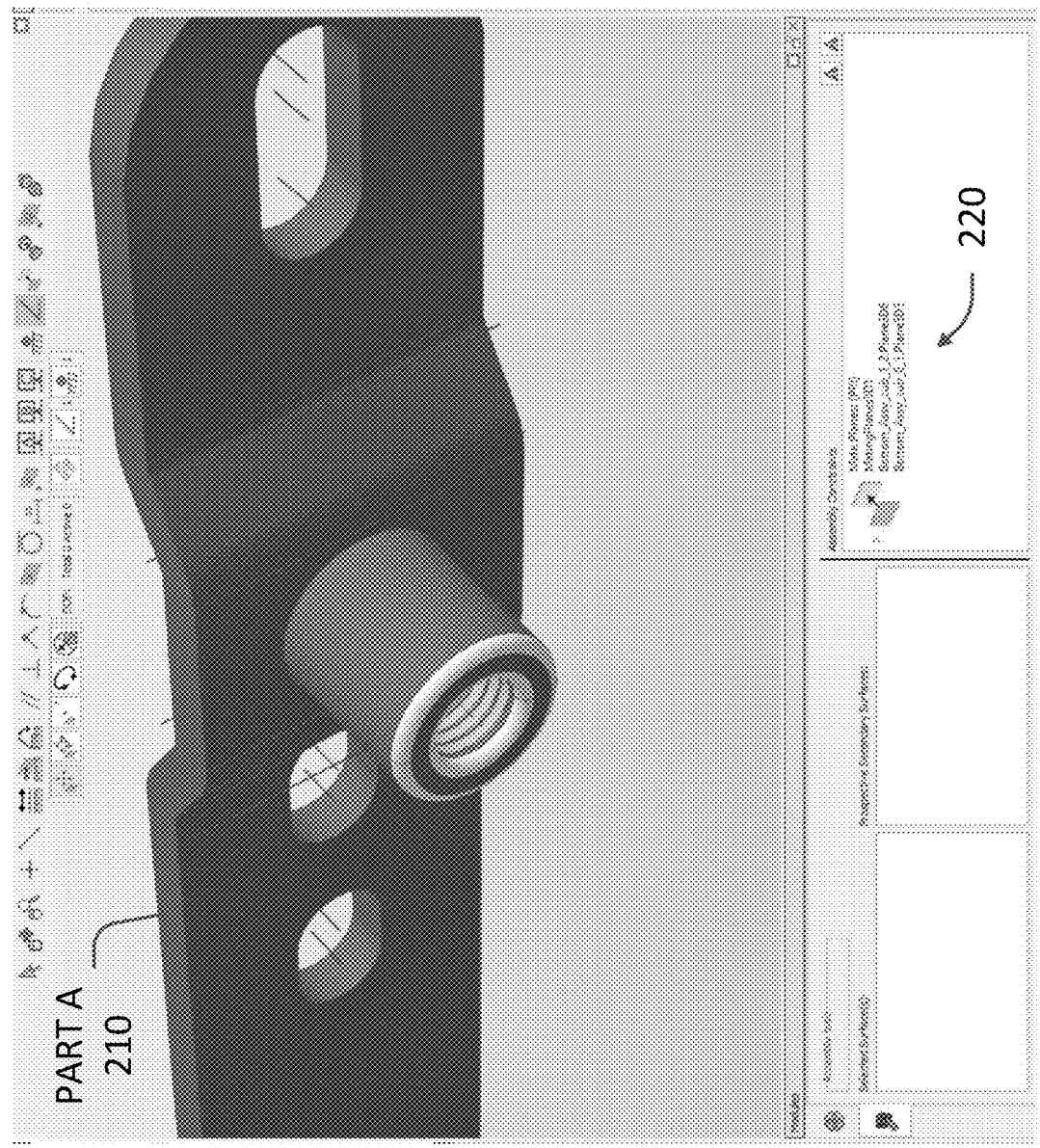

The application of constraints may begin with part A 210. As shown in FIG. 4, one instance of part A 210 ("Bottom_Assy_sub_1_2") is grounded to remove 6 degrees of freedom (DOF). As shown in FIG. 5, the other instance of part A 210 may then be constrained using a mate-planes constraint 220, a pin-in-hole constraint, and a lock-spin constraint to constrain its rotation about its axis. As a result, part A 210 is fully constrained.

Figure 6:
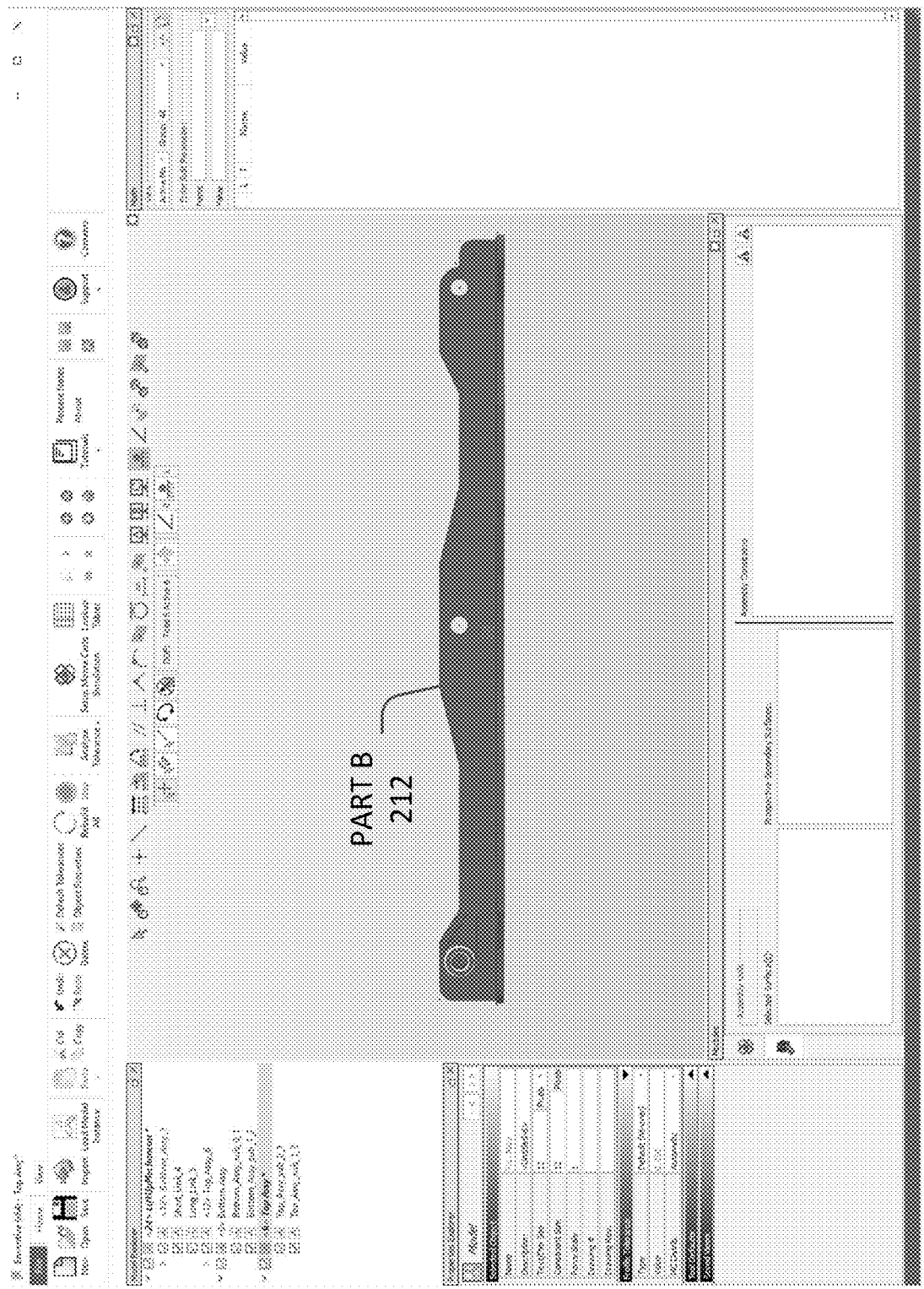
Figure 7:
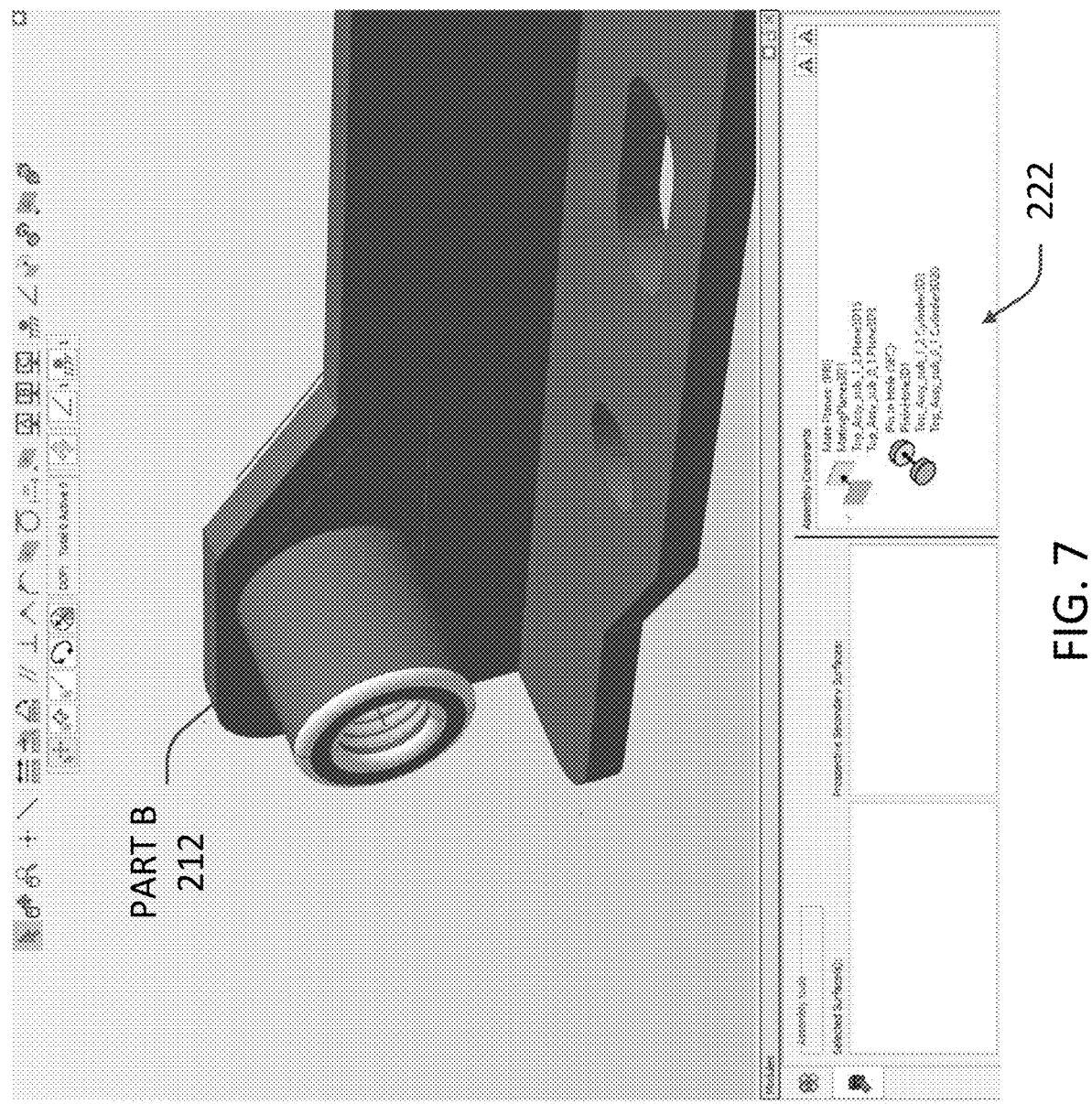

FIGS. 6 and 7 illustrate the application of constraints to part B 212 ("Top_Assy_sub_1_2"). As shown in FIG. 6, one instance of part B 212 is grounded to remove 6 degrees of freedom (DOF). As shown in FIG. 7, the other instance of part B 212 may then be constrained using a mate-planes constraint 222, a pin-in-hole constraint, and a lock-spin constraint to constrain its rotation about its axis. As a result, part B 212 is fully constrained, and all DOF of part B 212 are removed.

Figure 8:
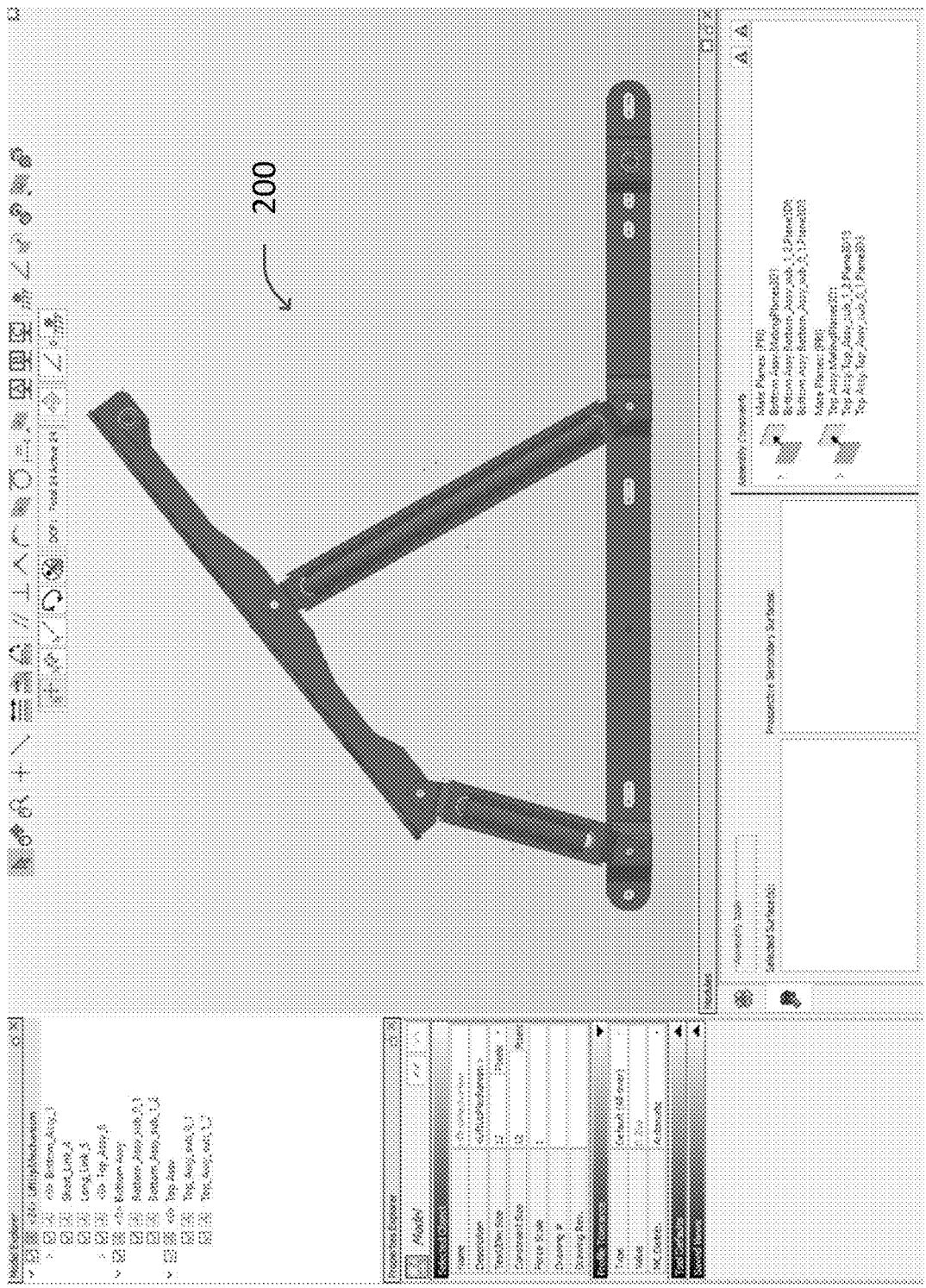
Figure 9:
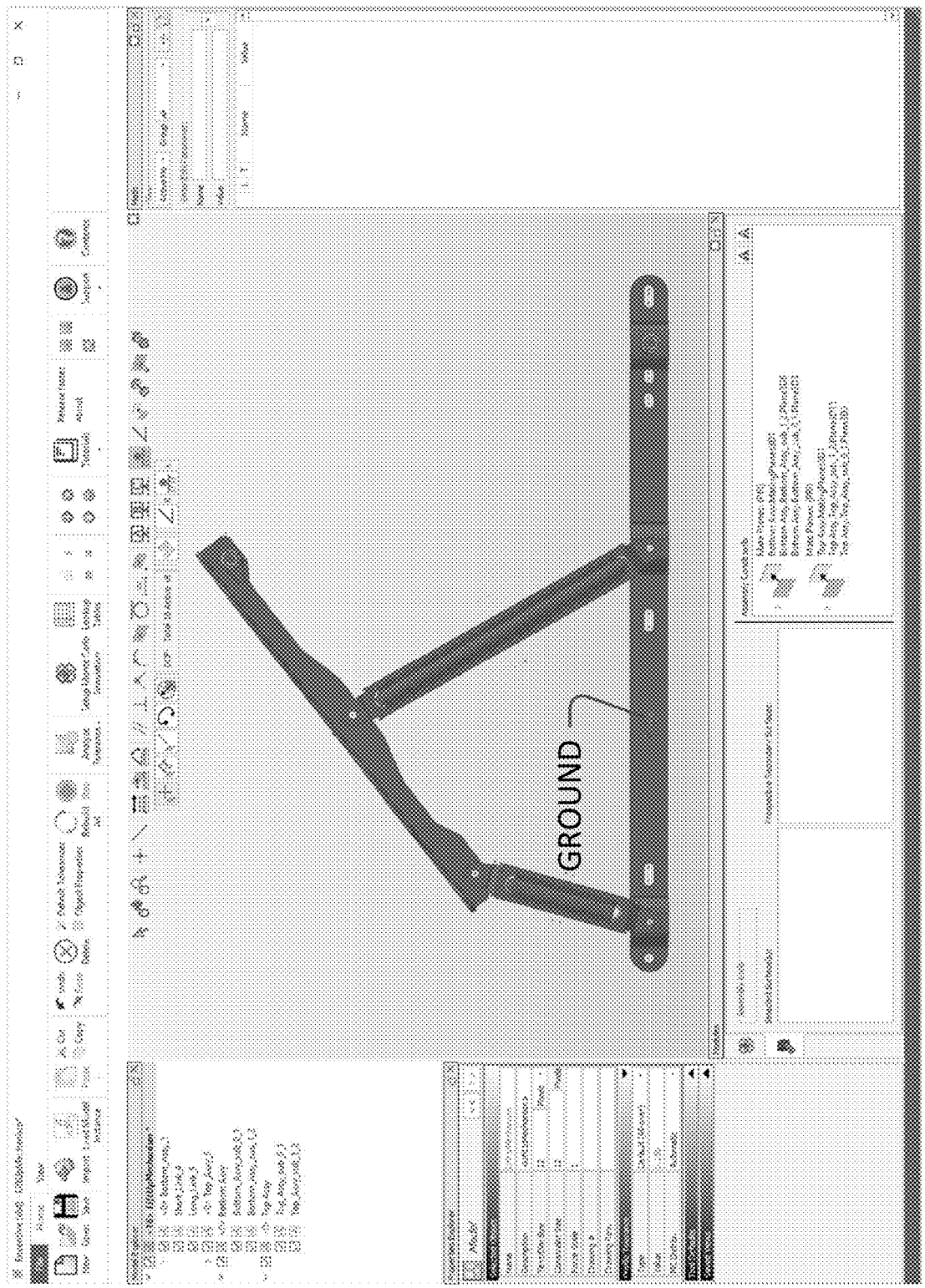
Figure 10:
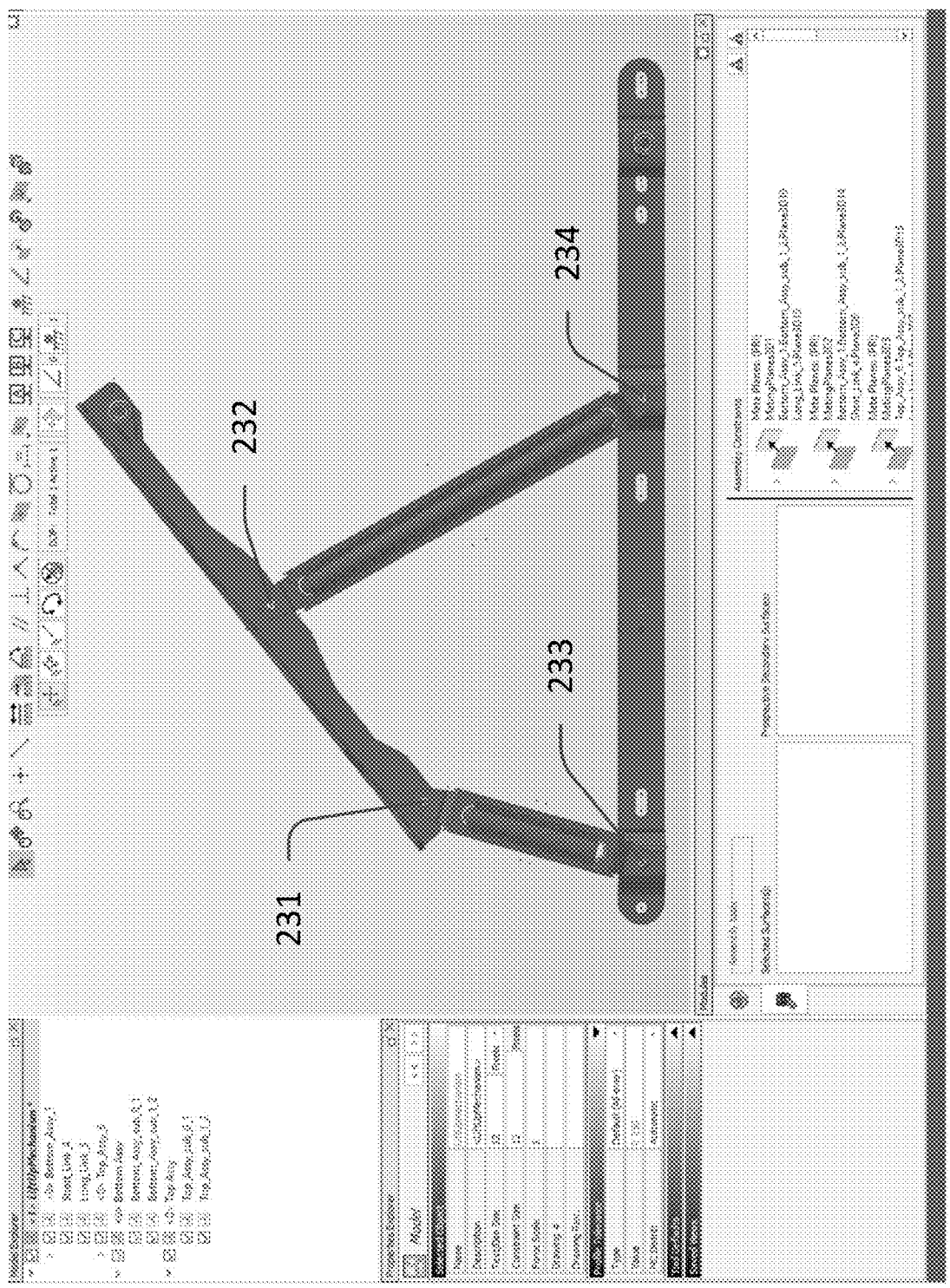
Figure 11:
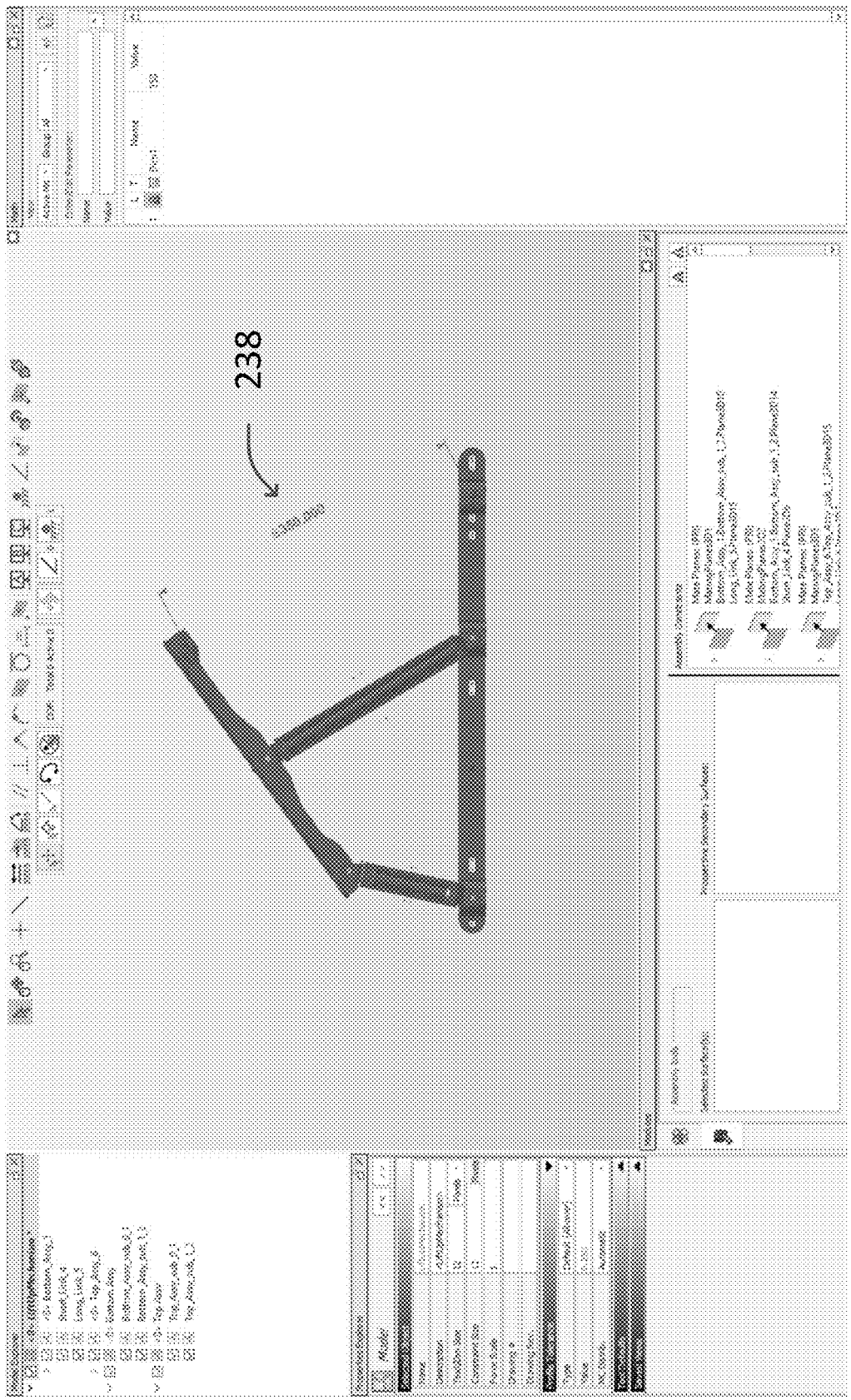

FIG. 8 shows a return to the entire assembly 200, where the total DOF of the assembly 200 has been reduced to 24. As shown in FIG. 9, the bottom instance of the assembly is then grounded, removing 6 DOF. Then, as shown in FIG. 10, at each joint 231-234, the two respective parts are constrained with a mate-planes constraint and a virtual-bolt constraint (except at the top left joint 231, which may be constrained using only a virtual-bolt constraint). Following the application of the above constraints, the assembly has 1 remaining DOF. As shown in FIG. 11, this remaining DOF may be constrained by applying a dimension 238 in place of the removed part E 218. As a result, the assembly 200 is fully constrained.

Figure 12:
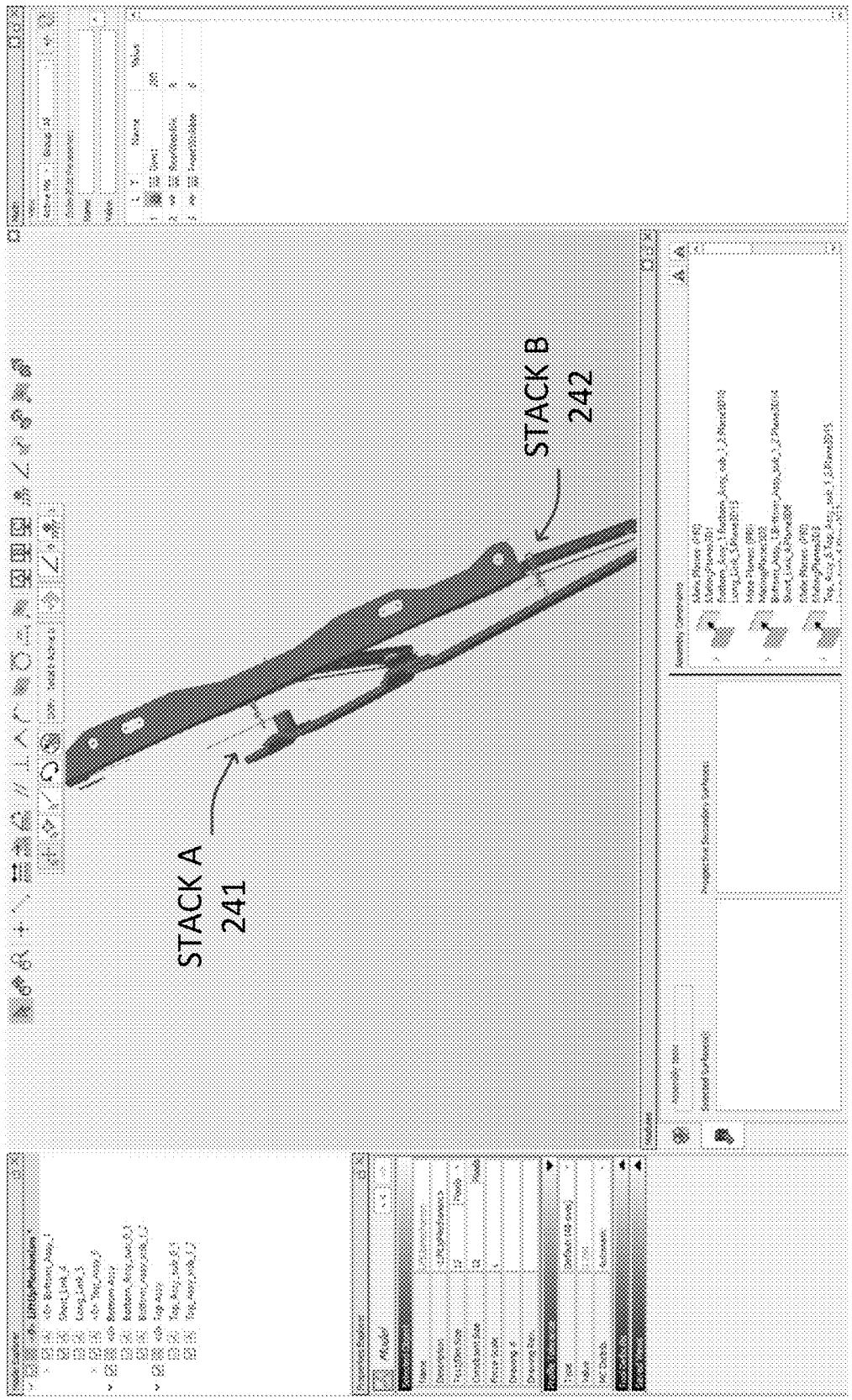
Figure 13:
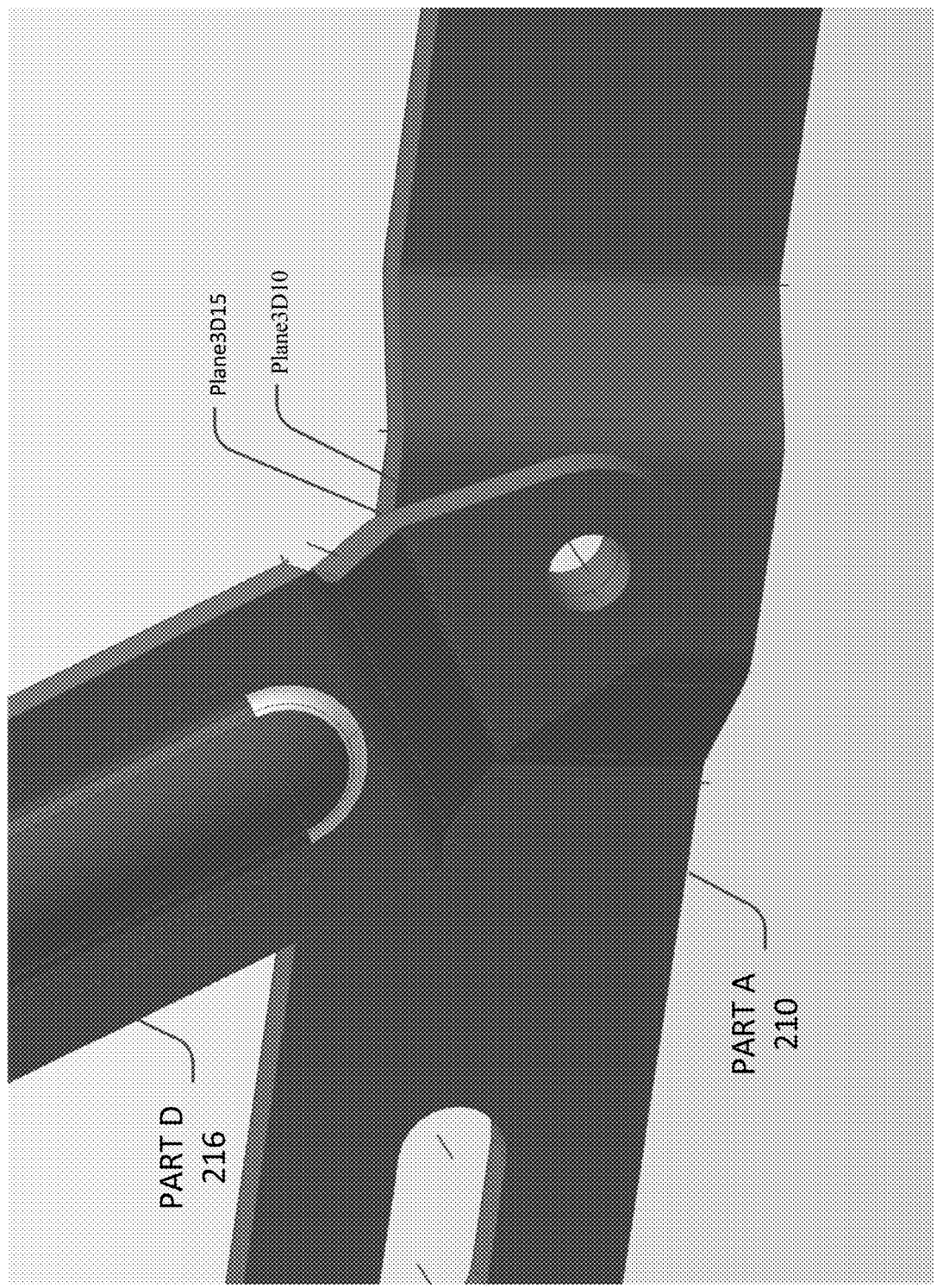

FIG. 12 illustrates the creation of two stacks 241, 242 to analyze the assembly 200. In this example, the stacks 241, 242 are configured to analyze how much the top portion of the assembly (including part B 212) moves in and out of a plane, relative to the bottom portion of the assembly (including part A 210). With the stacks defined, the system can perform a tolerance analysis of the assembly 200. As shown in FIG. 13, as part of the sensitivity analysis, it is determined that the mating planes constraint, MatingPlanes3D1, is a contributor to a stack (i.e., has a non-zero sensitivity). MatingPlanes3D1 constrains a planar surface (Plane3D10) on the bottom part A to a planar surface (Plane3D15) on the linking part D, as shown in FIG. 13.

The mating-plane constraint creates two Variational Surfaces over the two basic surfaces. The Variational Surfaces for planar basic surfaces are defined by a 3D point, $P_0$, a unit normal vector N, and the boundary trimming curves of the basic surface. The contributions to the tolerance stack, A, from a plane is the 3D vector δP of changes in $P_0$ and the 3D vector δN of changes to N. In the formula for the linearized stack, these contributions are:

$$\delta A = \ldots + Kori \cdot \delta N + Kpos \cdot \delta P + \ldots \quad (1)$$

Where Kpos is the 3D vector of sensitivity coefficients for the components of $P_0$ and Kori is the 3D vector of sensitivity coefficients for the components of N.

For example, a profile tolerance specification applied to a portion of the boundary surface of an instance creates a simple 3D region, referred to as the "tolerance zone," within which the boundary surface must remain. But there are contributions from variations to the parameters that describe that portion of that boundary, not from the surface of the instance itself. Thus, the simple tolerance zone of a profile specification must be translated into a complicated tolerance zone on the parameters.

Figure 14:
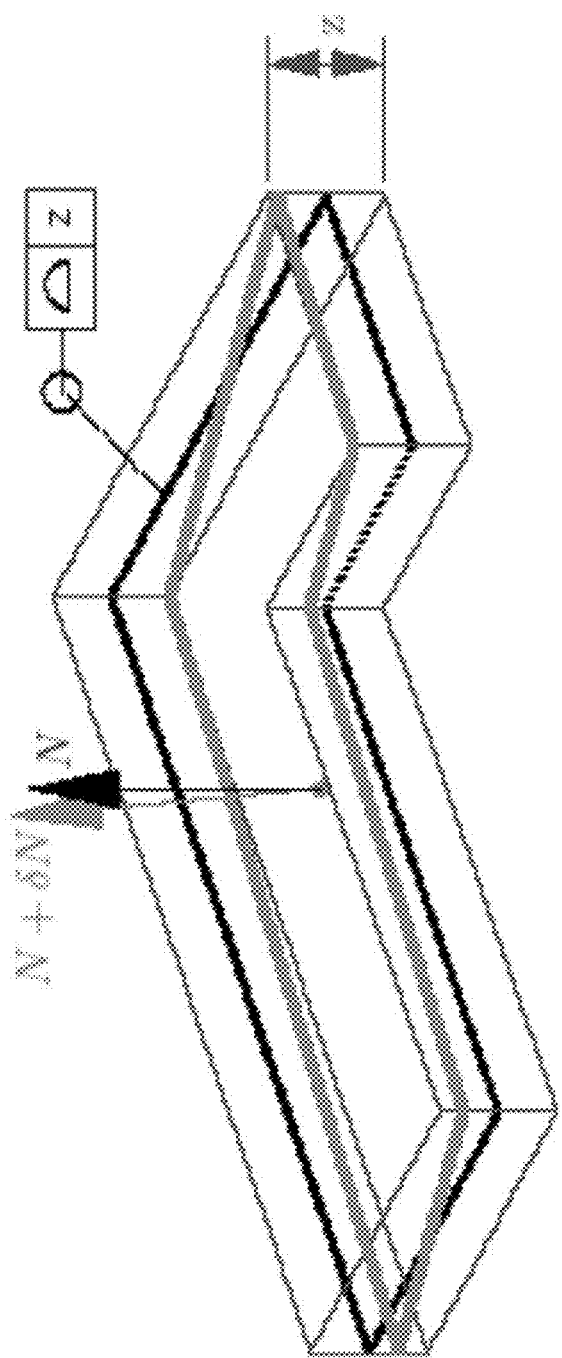

As an example, FIG. 14 uses an orthogonal projection to show some planar geometry with a 3D profile specification. The centered outline denotes the basic plane with the attached profile feature control frame. The volume denotes the tolerance zone centered on the basic plane. The diagonal polyline denotes an actual plane which has been tilted to one of its extreme orientations. The arrow N denotes the unit normal to the basic plane. The arrow N+δN denotes the unit normal to this tilted plane.

The volume depicts the simple surface profile tolerance zone for the surface. This volume can be translated into a tolerance zone for the change δN in the normal vector N and for the change δP in the point $P_0$ that controls the offset of this basic plane. The components of N and $P_0$ are contributors for the sensitivity analysis. An example procedure to convert the sensitivity coefficients into the parameters of the tolerance zone of the stack is described below. An example procedure to compute the worst case (limit) variation to the stack and the statistical variation to the stack is also described below.

Figure 15:
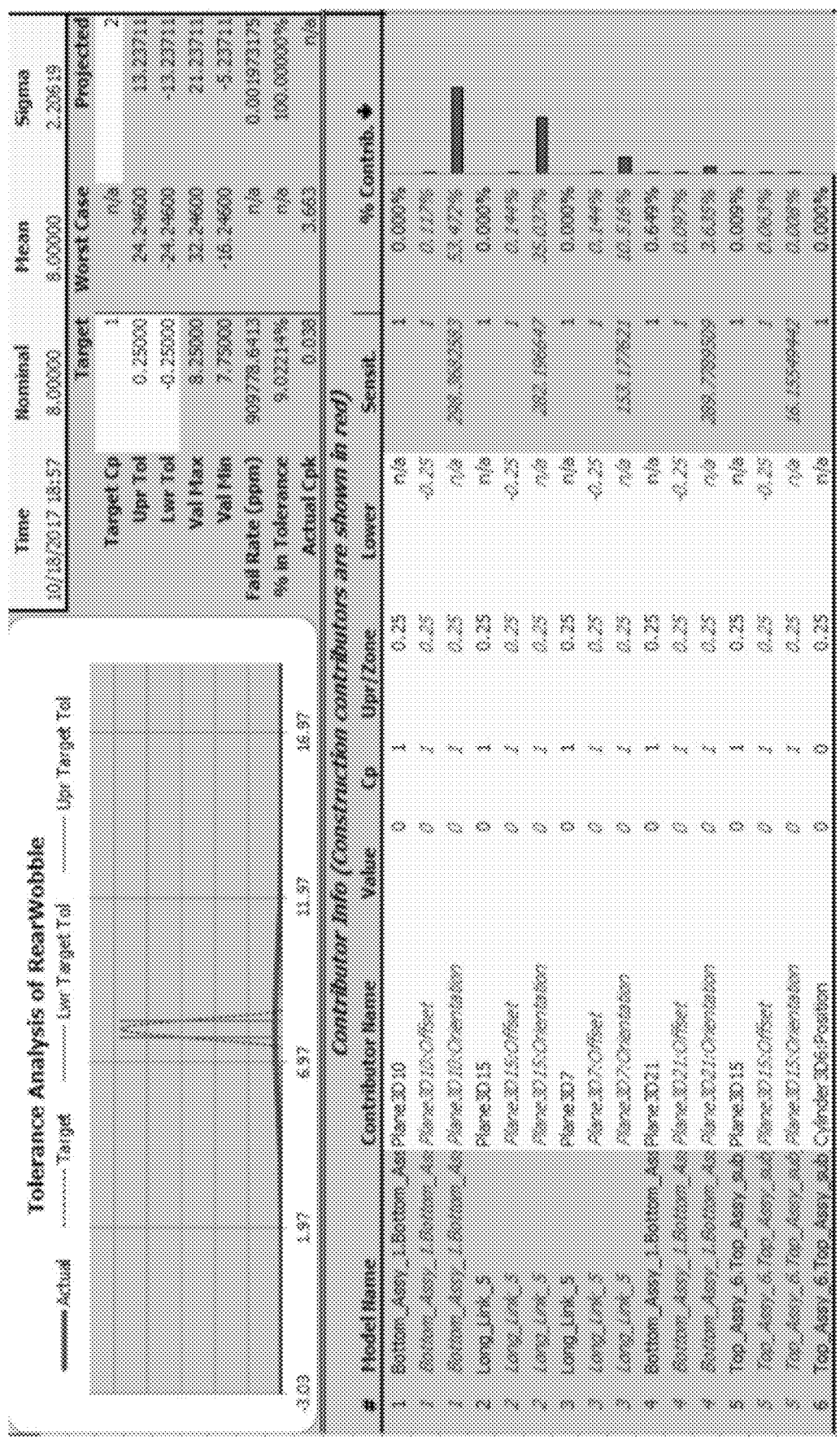

FIG. 15 illustrates a report of the result of the tolerance analysis described above, including a table and plot. As shown, the Plane3D10 has the most effect on the variation of the Stack, and that almost all of the variation comes from its orientation, not its offset. Using this report, the properties of the model can be revised in a number of ways, as described below, to meet design or operational requirements.

Figure 16:
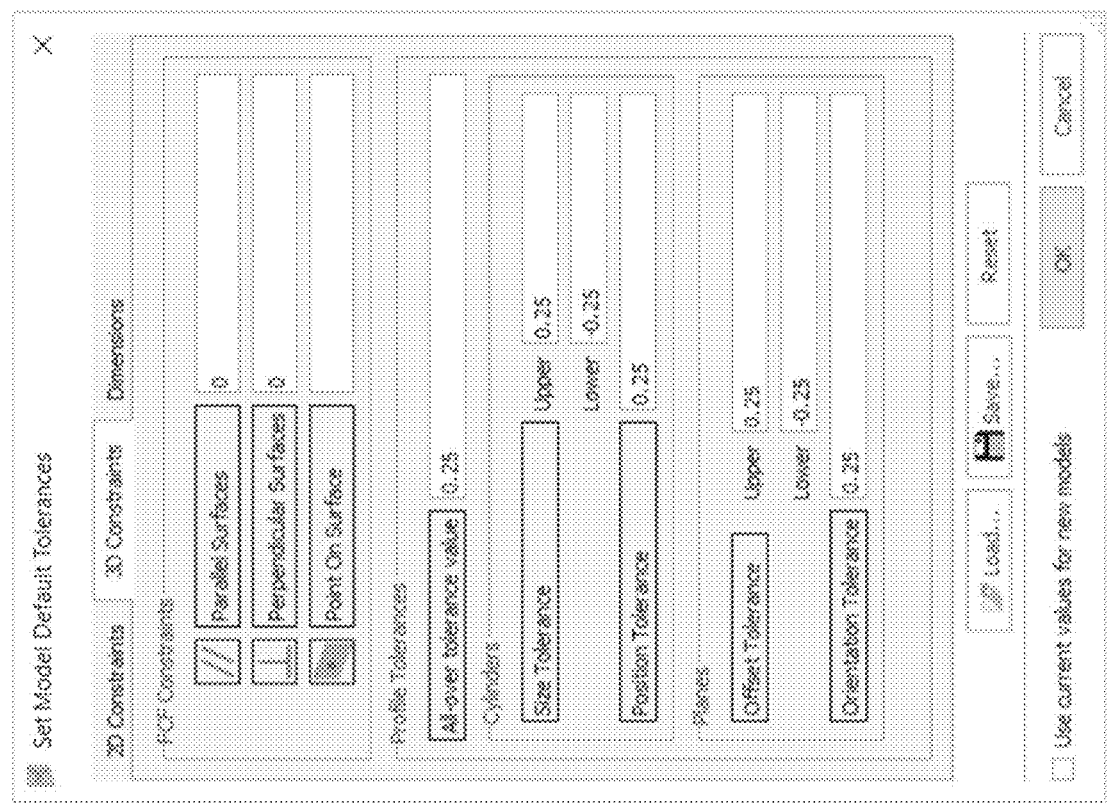

FIG. 16 illustrates an interface for entering and revising tolerance values of the assembly 200. Through this interface, there are several ways to enter profile tolerances. If the user wishes to override the "default all-around" profile tolerance, they can enter profile tolerances for basic surfaces in the following manners:

a) The user can specify a "user-defined all-around" profile tolerance for all basic surfaces in a part by altering the "default all-around" tolerance specification.

b) For any planar surface of a part, the user can specify the use of the "default planar" profile tolerance.

c) For any planar surface of a part, the user can specify a "user-defined planar" profile tolerance, including the specification of both the offset and orientation tolerances in place of a profile tolerance.

d) For any cylindrical surface of a part, the user can specify the use of the "default cylindrical" profile tolerance.

e) For any cylindrical surface of a part, the user can specify a "user-defined cylindrical" profile tolerance, including the specification of both the size and position tolerances in place of a profile tolerance.

Figure 17:
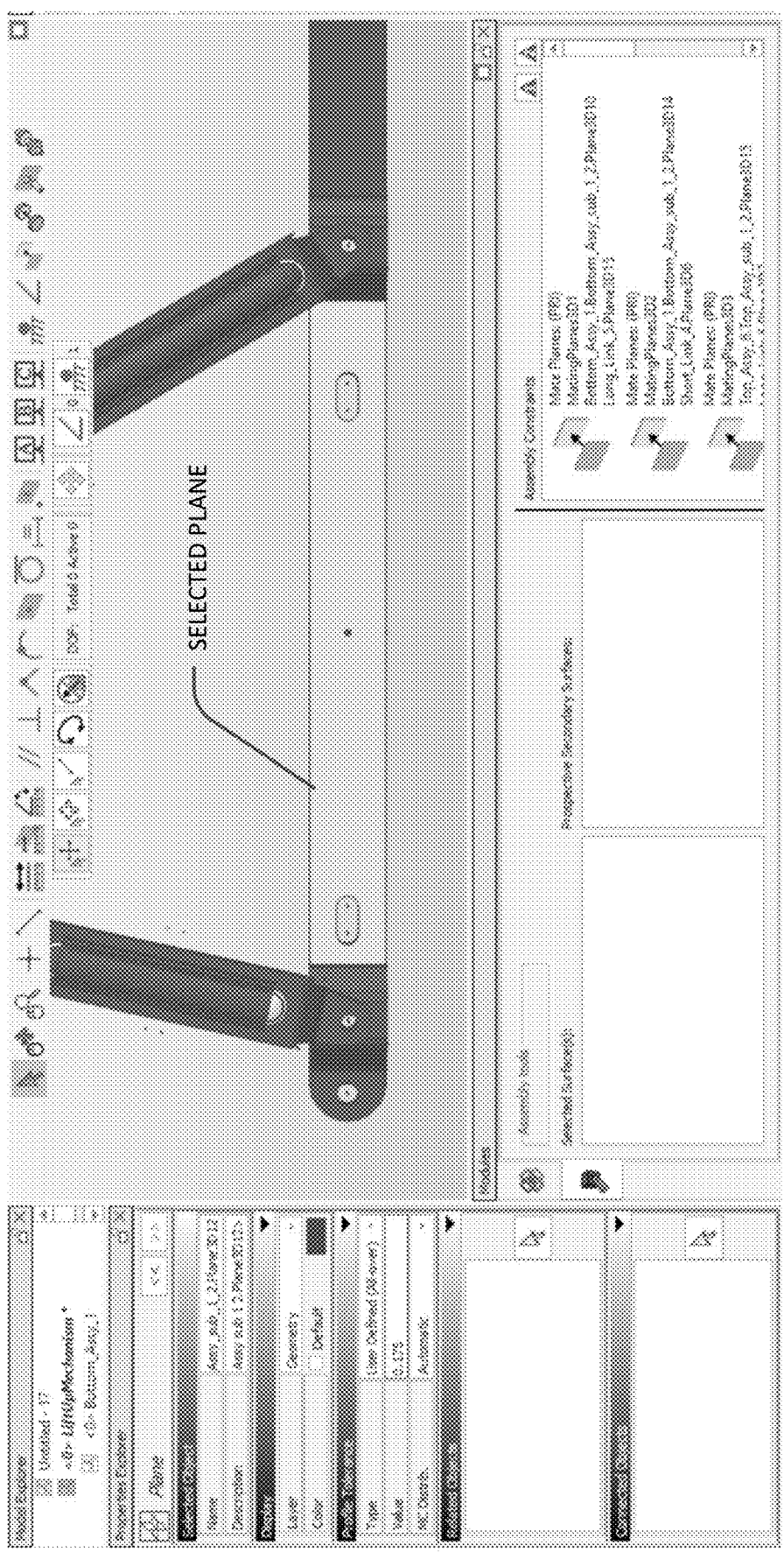

FIG. 17 illustrates the user interface during a selection of a surface of a part. The Profile Tolerances section of the Properties Explorer (as seen at the left side of the interface) enables entry of defaults for an all-over tolerance value, as well as defaults for cylindrical and planar surfaces, if the user chooses those values. If the user selects a plane as shown, for example, a different all-around profile tolerance can be entered. Alternatively, as shown in the Profile Tolerance Box in FIG. 18, the user can enter specific tolerance values for the offset and orientation tolerances of the selected plane. This option enables the user to enter a tighter tolerance on the critical surface, Plane3D10, and to quickly observe the resulting changes to the Stack analysis.

Figure 18:
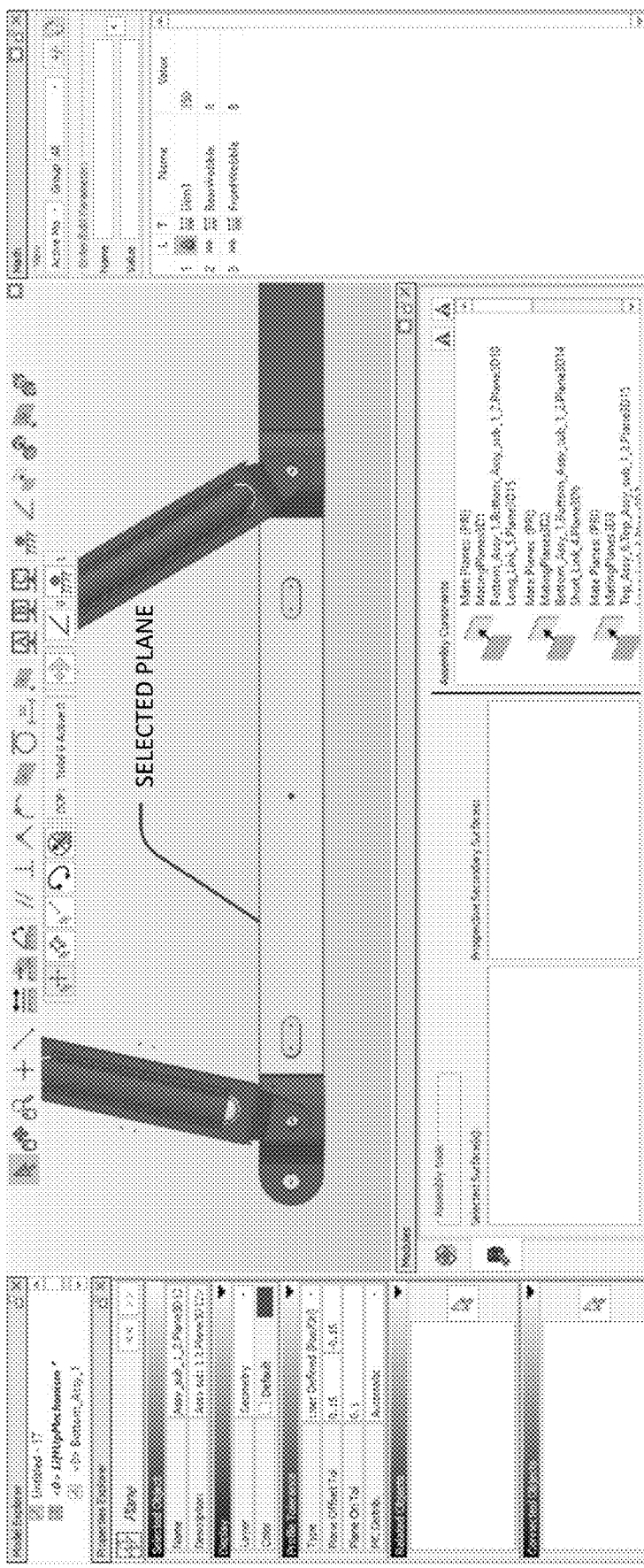
Figure 19:
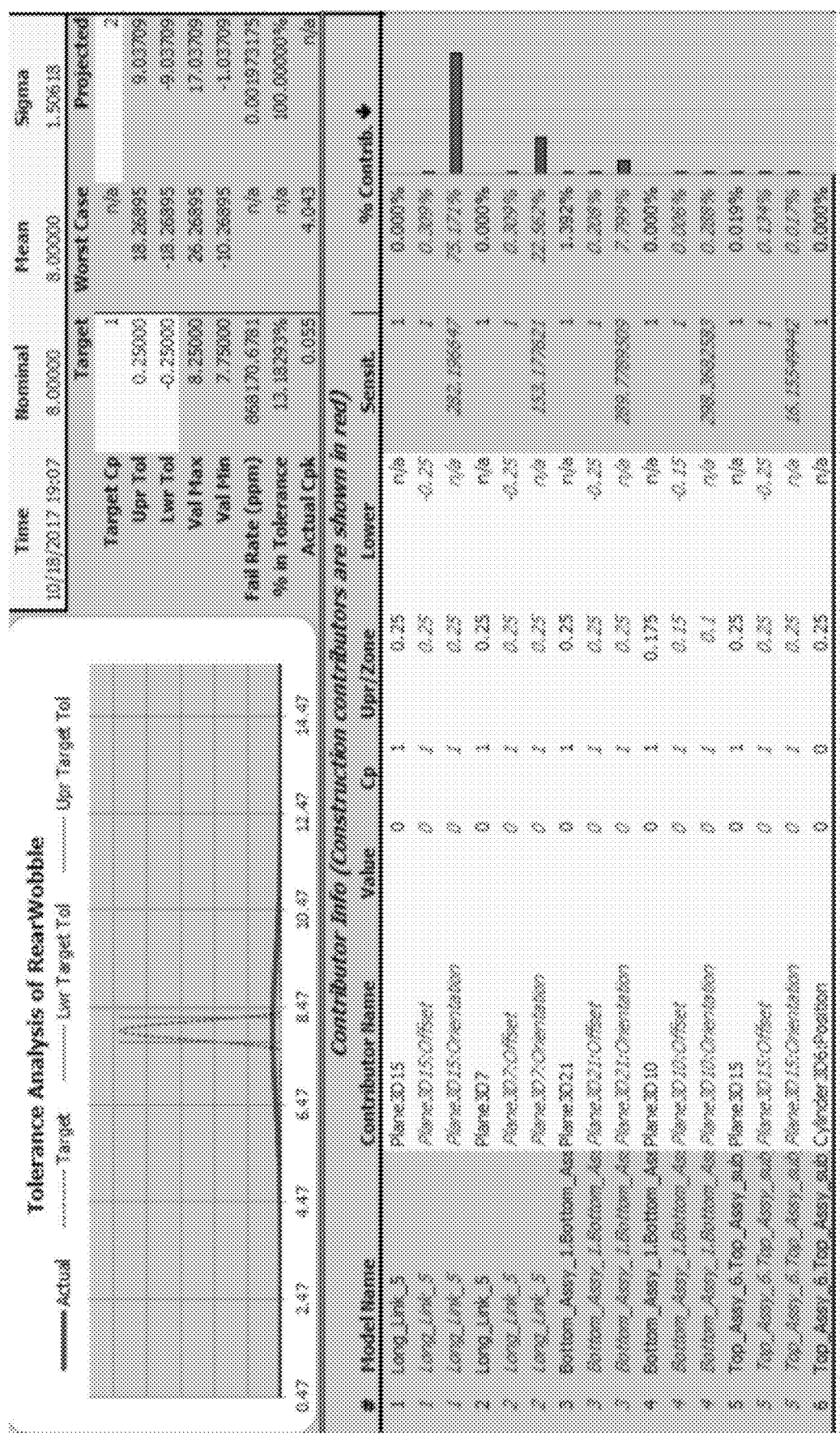

FIG. 19 illustrates a tolerance analysis report resulting from the change in tolerance values entered in FIG. 18. As can be seen, the effect of Plane3D10 has been greatly reduced, thereby reducing the variation of the Stack.

Figure 20:
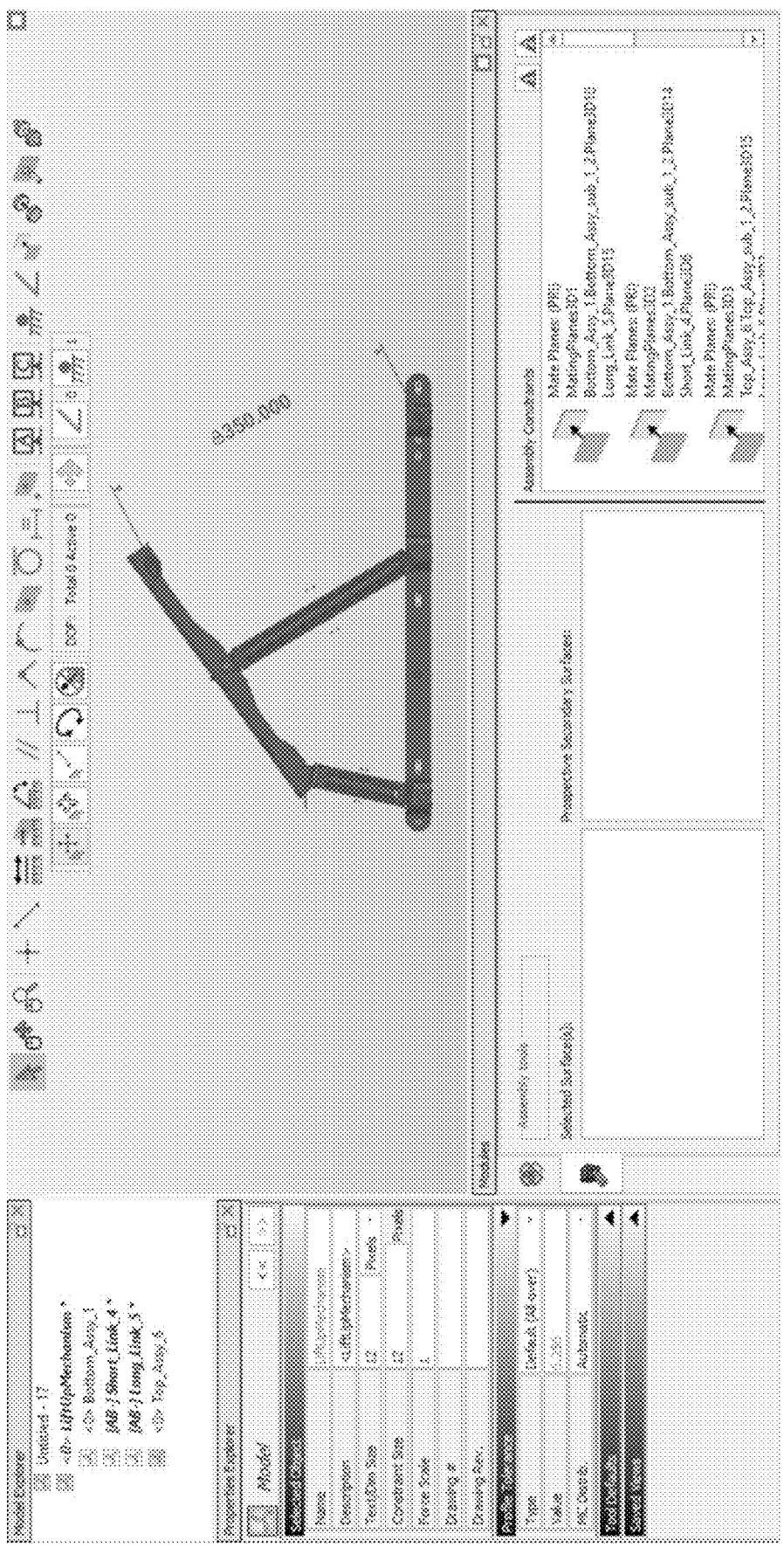
Figure 21:
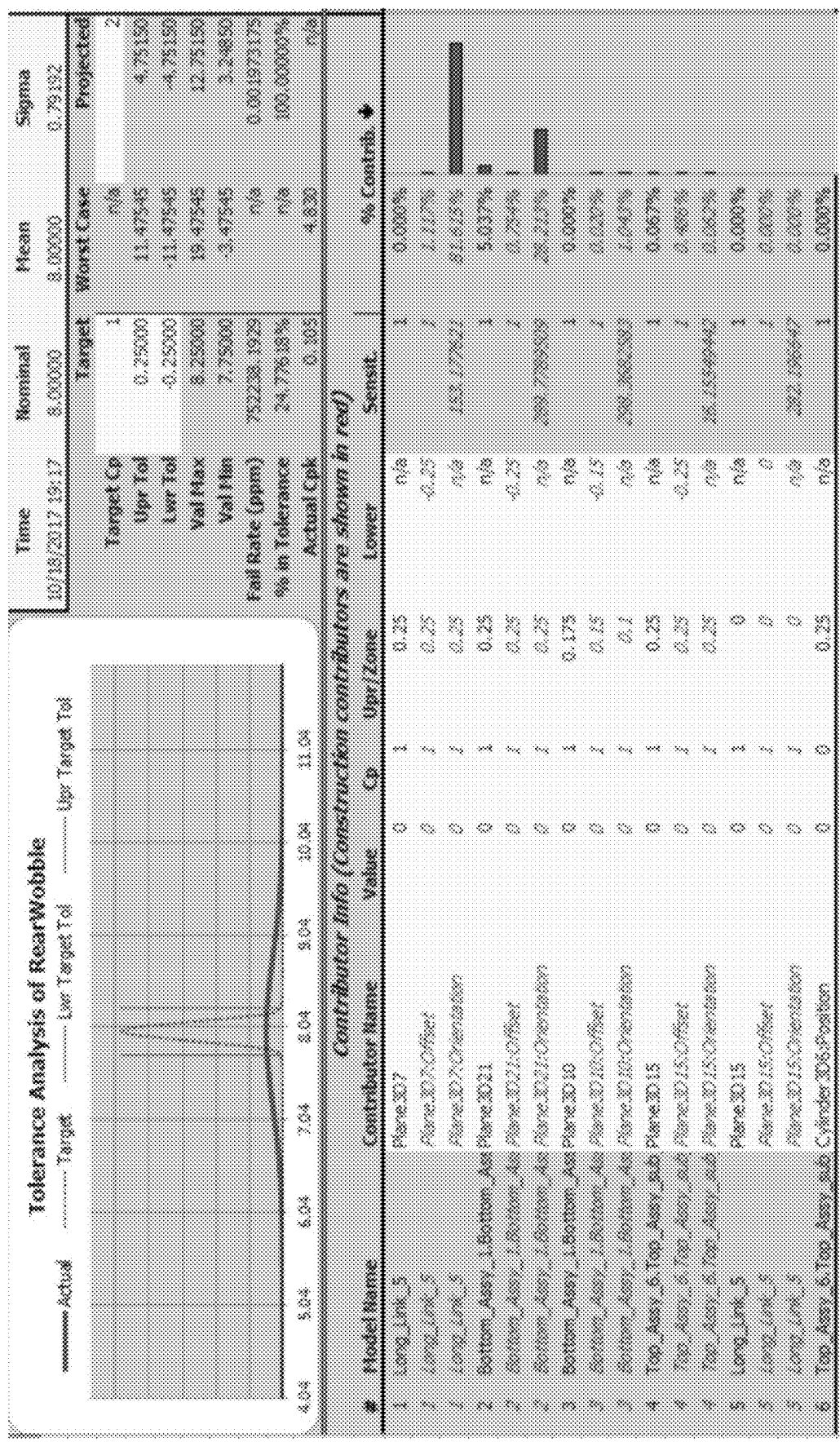

Example embodiments may also allow the user to assign datums to each part from the assembly 200 to analyze the effects on Stack variation. For example, the report shown in FIG. 19 indicates that the planar Contributor, Plane3D15, in the "LongLink" part (part D 216) is now the most critical Contributor. Accordingly, the user can assign datums to the "LongLink" (and "ShortLink") parts, as shown in FIG. 20. With the datums assigned, the tolerance analysis can be repeated, resulting in the tolerance analysis report shown in FIG. 21. Here, in the analysis of the "RearWobble" Stack, we find that the Stack variation has been reduced even more. The final datum designation may be a negotiation between engineers, designers, and those people on the manufacturing floor. Example embodiments can help to facilitate this discussion between all interested parties by clearly showing the effects of given datum assignments.

Example embodiments can be implemented in a range of different systems and other solutions. For example, a system may be configured for constraining parts in an assembly, using the nominal geometry for each part as imported from a CAD system, without requiring the parts to have internal constraints. Further, a system may be configured for performing tolerance analysis of stacks in an assembly, using parts imported from a CAD system, without requiring the parts to have internal constraints. A system may also be configured for assigning profile tolerances of nominal geometry for each part in an assembly as exported from a CAD system without modification, and then performing an analysis incorporating the updated profile tolerances. A system may also be configured for assigning surface datums of nominal geometry for each part in an assembly as exported from a CAD system without modification, and then performing an analysis incorporating the updated datum references.

Previous methods include the ability to attach geometric dimensioning and tolerancing (GD&T) specifications to surfaces. However, GD&T specifications attached to surfaces in CAD models are only available as annotation and don't support direct tolerance analysis. Previous methods also include the ability to designate certain surfaces in a CAD system as datums. However, these designations merely comprise annotations.

Previous methods also include 3D systems, such as VSA, 3DCS, and CETOL. The primary differentiation is that this disclosure introduces a new surface-based approach. This allows our disclosure to immediately recompute Stack variation after the user makes changes to the datum selection, or changes the GD&T information, without further model or constraint revisions; the user does not have to modify the constraint scheme to update the results. This contrasts with the point-based approach of VSA and 3DCS. They do not allow the modification of datum surfaces without revising the underlying model.

Figure 22:
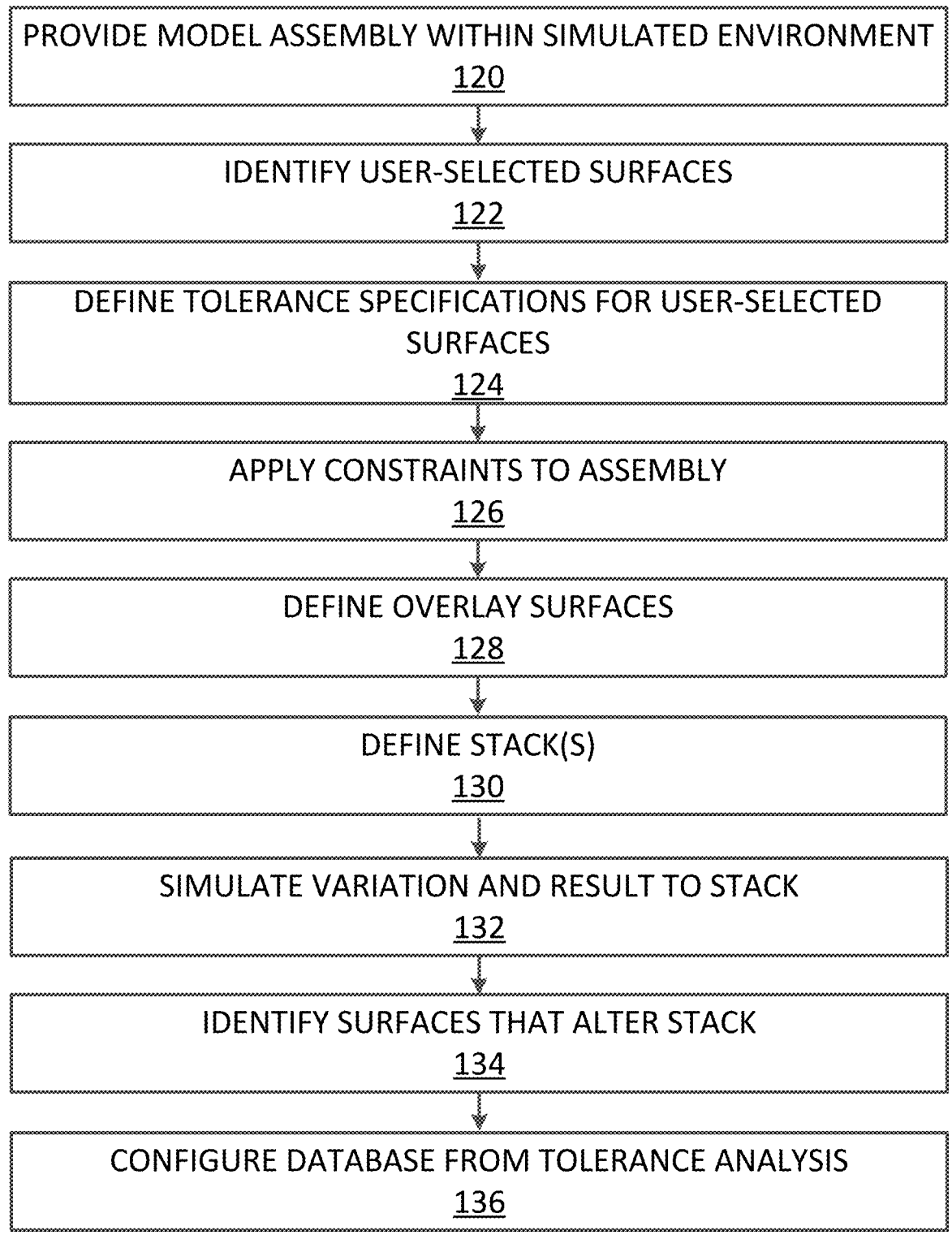
FIG. 22 is a flow diagram illustrating a process that may be carried out by a computer-aided design system, to provide tolerance analysis in one embodiment.

FIG. 22 is a flow diagram of process 101 that may be carried out by a computer-aided design system, as described above with reference to FIGS. 1-21, to provide tolerance analysis of model assemblies. With reference to FIGS. 2-21, a model assembly 200 can be provided within a simulated environment of the system, the assembly including a plurality of parts 210-218 (120). User-selected surfaces of the model assembly 200 may be identified by the system (122), and tolerance specifications for each of the user-selected surfaces may be defined based on automated selection, default values, or user-selected values (124) (see, e.g., FIGS. 4-14, 16-18, and accompanying description above). The user-selected surfaces may include at least two surfaces in contact with one another between the at least two of the plurality of parts.

The system may then apply a plurality of constraints to the assembly based on the user-selected surfaces, where each of the plurality of constraints defining a relationship between surfaces of at least two of the plurality of parts (126) (see, e.g., FIGS. 4-14 and accompanying description above). The system may define overlay surfaces at the assembly, where each of the overlay surfaces corresponds to a respective one of the user-selected surfaces (128). Each of the overlay surfaces may exhibit a position within the assembly equivalent to a position of the respective one of the user-selected surfaces. Each of the overlay surfaces may also exhibit a geometry equivalent to a geometry of the respective one of the user-selected surfaces, the geometry including the respective tolerances. Each of the plurality of constraints may define a relationship between at least two of the overlay surfaces. Each of the overlay surfaces may be constrained to at least one other of the overlay surfaces as a function of at least one of the plurality of constraints. The system may further represent a plurality of surfaces of the assembly with the overlay surfaces. Each of the overlay surfaces may be defined by a mathematical rule encompassing an infinity of points.

The system may define one or more stacks 241, 242 based on a user input, the stacks being a measurement dimension encompassing at least two of the plurality of parts (130) (see, e.g., FIG. 12 and accompanying description above). The system may then simulate 1) variation of the overlay surfaces across a range of variation values within a respective tolerance zone based on the tolerance specifications and 2) alteration of the stack as a result of the variation (132) (see, e.g., FIG. 15 and accompanying description above). Simulating the variation may include 1) generating one of the overlay surfaces for each of the user-selected surfaces, 2) positioning the overlay surface at the assembly, and 3) altering at least one of size, position, offset and orientation of the overlay surface. The system may further determine a function relating 1) the stack, 2) the user-selected surfaces, 3) the plurality of constraints, and 4) the respective tolerance. The overlay surfaces may include a planar surface, and wherein the altering includes altering at least one of offset and orientation of the planar surface. The overlay surfaces may include a cylindrical surface, and wherein the altering includes altering at least one of size and position of the planar surface.

Based on the variation of the overlay surfaces, the system may identify a subset of the user-selected surfaces that, when varied within the respective tolerance zone, alter the stack (134) (see, e.g., FIGS. 15, 19, and accompanying description above). The system can configure a database to indicate 1) the user-selected surfaces and 2) respective contributor values indicating a relative contribution of each of the user-selected surfaces to the stack (136) (see, e.g., FIGS. 15, 19, and accompanying description above). The system may further configure the database to indicate a relation between a variation type and the respective contributor value, the variation type including at least one of size, position, offset and orientation. The database can be reported to the user in the form of a tolerance analysis report as described above, enabling the user to revise tolerances, datums, part geometry, and/or other properties of the assembly to meet given design requirements or goals. Based on the simulation, the system may further determine a modification to a respective tolerance value that maintains the stack within a threshold range of values. The system may further update the simulation based on the modification to the respective tolerance value, and may modify the model assembly to incorporate the modification to the respective tolerance value.

The system may further simulate movement of the assembly through at least one degree of freedom permitted via the plurality of constraints, and may identify the subset of the user-selected surfaces based on the movement. The system may further apply a datum to at least one of the user-selected surfaces, where the datum establishes a reference point for the user-selected surfaces. Simulating the variation may include expressing the user-selected surfaces as coordinates based on the datum.

Figure 23:
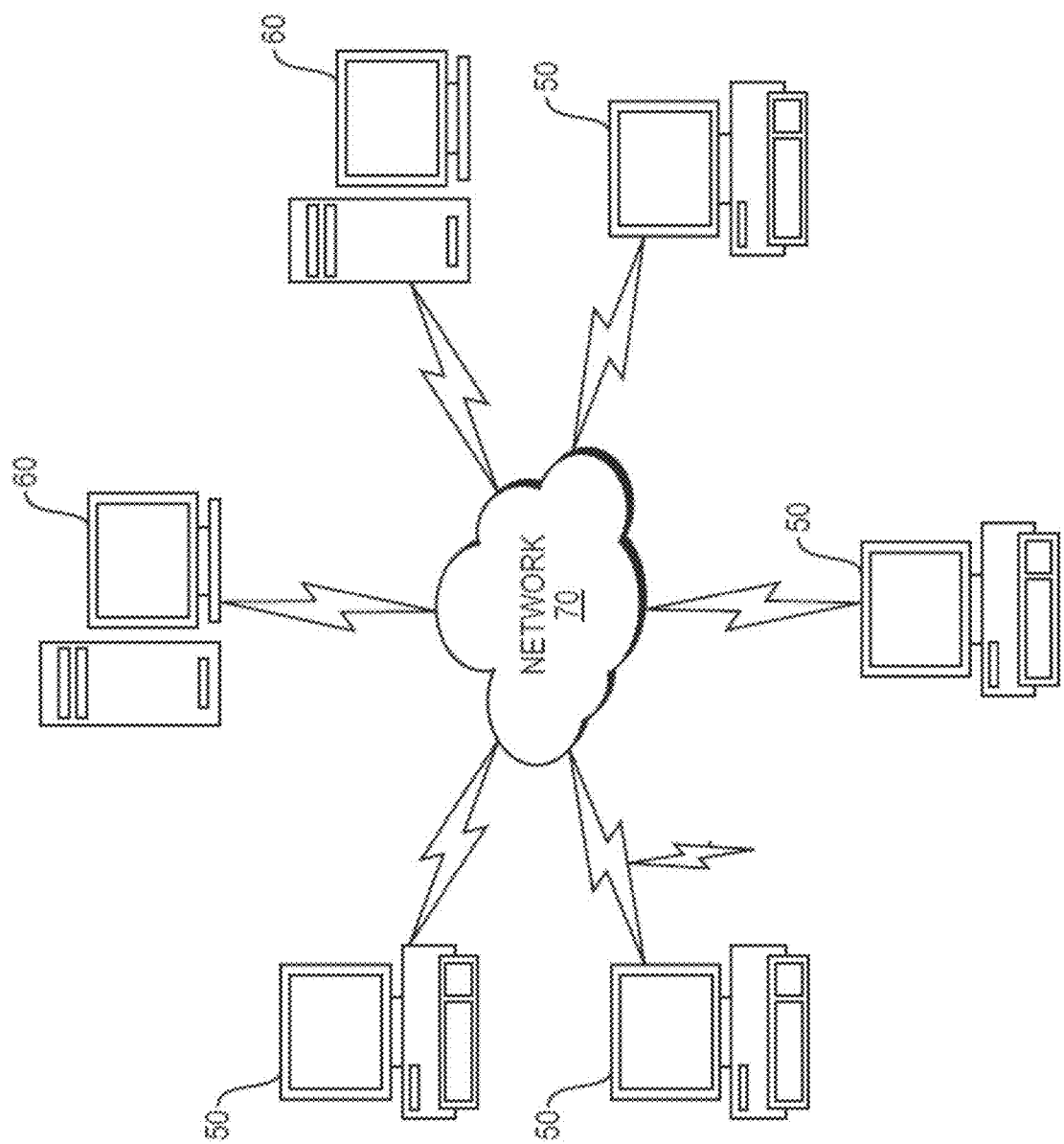
FIG. 23 is a schematic view of a computer network in which embodiments of the present invention may be implemented.

FIG. 23 illustrates a computer network or similar digital processing environment in which embodiments of the present invention may be implemented.

Client computer(s)/devices 50 and server computer(s) 60 provide processing, storage, and input/output devices executing application programs and the like. The client computer(s)/devices 50 can also be linked through communications network 70 to other computing devices, including other client computer(s)/devices 50 and server computer(s) 60. The communications network 70 can be part of a remote access network, a global network (e.g., the Internet), a worldwide collection of computers, local area or wide area networks, and gateways that currently use respective protocols (TCP/IP, Bluetooth®, etc.) to communicate with one another. Other electronic device/computer network architectures are suitable.

Figure 24:
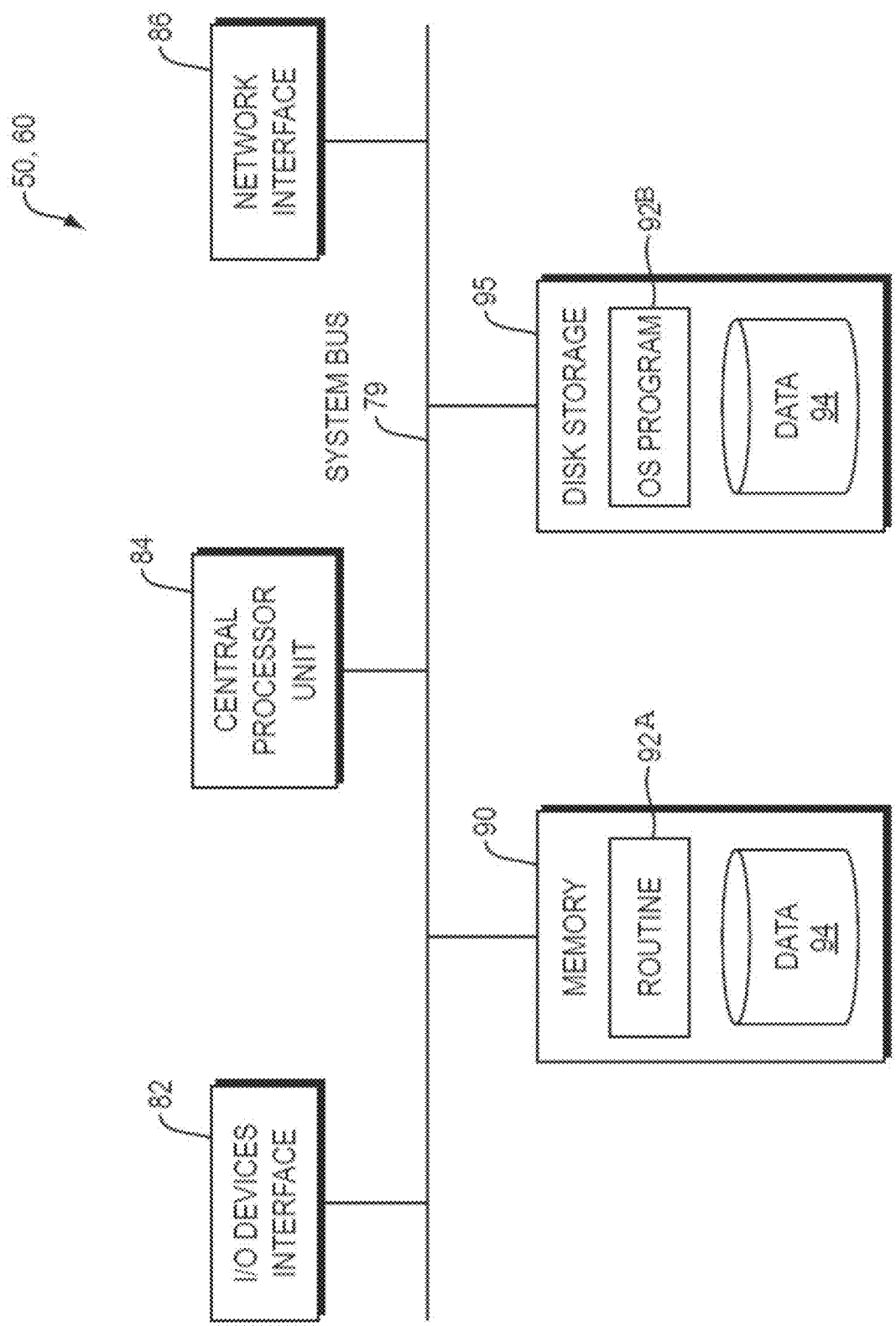
FIG. 24 is a block diagram of a computer system in which embodiments of the present invention may be implemented.

FIG. 24 is a diagram of an example internal structure of a computer (e.g., client processor/device 50 or server computers 60) in the computer system of FIG. 5. Each computer 50, 60 contains a system bus 79, where a bus is a set of hardware lines used for data transfer among the components of a computer or processing system. The system bus 79 is essentially a shared conduit that connects different elements of a computer system (e.g., processor, disk storage, memory, input/output ports, network ports, etc.) that enables the transfer of information between the elements. Attached to the system bus 79 is an I/O device interface 82 for connecting various input and output devices (e.g., keyboard, mouse, displays, printers, speakers, etc.) to the computer 50, 60. A network interface 86 allows the computer to connect to various other devices attached to a network (e.g., network 70 of FIG. 5). Memory 90 provides volatile storage for computer software instructions 92 and data 94 used to implement an embodiment of the present invention (e.g., structure generation module, computation module, and combination module code detailed above). Disk storage 95 provides non-volatile storage for computer software instructions 92 and data 94 used to implement an embodiment of the present invention. A central processor unit 84 is also attached to the system bus 79 and provides for the execution of computer instructions.

In one embodiment, the processor routines 92 and data 94 may include a computer program product (generally referenced 92), including a non-transitory computer-readable medium (e.g., a removable storage medium) that provides at least a portion of the software instructions for the invention system. The computer program product 92 can be installed by any suitable software installation procedure, as is well known in the art. In another embodiment, at least a portion of the software instructions may also be downloaded over a cable communication and/or wireless connection.

The diagrams of FIGS. 1-24 are examples that can include more or fewer components, be partitioned into subunits, or be implemented in different combinations. Moreover, the flow diagrams and components of the block diagrams may be implemented in hardware, firmware, or software. If implemented in software, the software may be written in any software language suitable for use in computer systems and networks as illustrated in FIGS. 23 and 24. The software may be embodied on any form of computer readable medium, such as RAM, ROM, or magnetic or optical disk, and loaded and executed by generic or custom processor(s).

Mathematical Derivations 1.1 The Surface Span Method

The following sections make repeated use of the surface span method. This method assumes a surface, and 3D point, $P_o$, and a 3D direction, D. This point and direction determine a 3D line which is the collection of all points P where:

$$P = P_o + t\,D \quad (2)$$

for all positive and negative real numbers t.

This span method returns the smallest and largest values for t that covers the projection of the surface on to this line.

1.2 Contribution from a Plane

Figure 25:
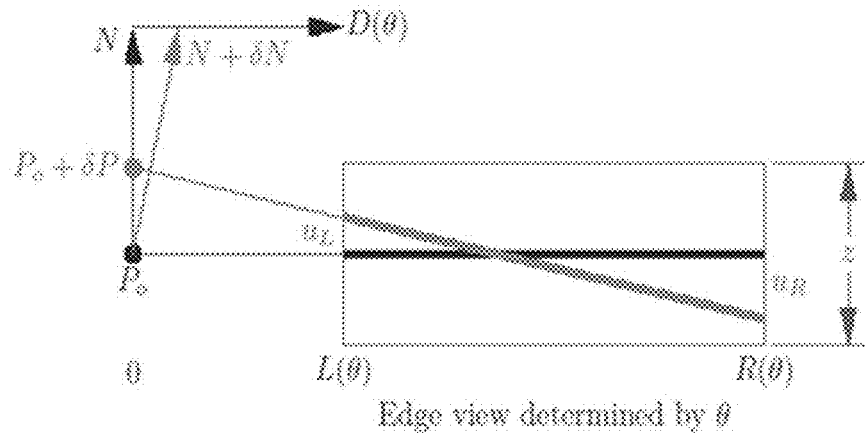
FIGS. 25-39 are diagrams illustrating mathematical derivations supporting example embodiments.

When we change the view in FIG. 14 so we see the plane edge on and we see a true view of both N and $D(\theta)$, then we get a view in FIG. 25. The basic plane, seen edge on, is the thick black line. The surface span method when called with $P_o$ and $D(\theta)$ would give us the values of $L(\theta)$ and $R(\theta)$ as functions of the angle $\theta$. The point $P_o$ which is used to locate the plane is shown to the left of the Variational Surface, but it can be anywhere relative to the Variational Surface so the values for $L(\theta)$ and $R(\theta)$ can be negative.

The profile tolerance zone is the large rectangle, with the value z being the profile tolerance specification. A sample actual plane is shown as the diagonal line, moved to $P_o + \delta P$ and tilted to $N + \delta N$. The tolerance zone is defined by limits on the values for $u_L$ and $u_R$:

$$-\tfrac{1}{2}z \le u_L \le \tfrac{1}{2}z$$

$$-\tfrac{1}{2}z \le u_R \le \tfrac{1}{2}z \quad (3)$$

Given the vector $D(\theta)$ parallel to the plane, we can state the variations in the orientation $\delta N$ and position $\delta P$ as:

$$\delta N = \alpha D(\theta)$$

$$\delta P = \beta N \quad (4)$$

We obtain the formulae for $u_L$ and $u_R$ in terms of $\alpha$ and $\beta$ using a standard mathematical approach. The values for $L(\theta)$ and $R(\theta)$, computed by the span method, are functions of the angle $\theta$. While $D(\theta)$ is a three dimensional vector, it is constrained to be both a unit vector and parallel to the plane, so it is completely defined by an angle $\theta$. All this results in the equations:

$$u_L = \beta - L(\vartheta)\alpha$$

$$u_R = \beta - R(\vartheta)\alpha \quad (5)$$

Using these formulae result in the following inequalities which define the tolerance zone for the given direction vector $D(\theta)$.

$$-\tfrac{1}{2}z \le \beta - L(\theta)\alpha \le \tfrac{1}{2}z$$

$$-\tfrac{1}{2}z \le \beta - R(\theta)\alpha \le \tfrac{1}{2}z \quad (6)$$

This results in the tolerance zone shown in FIG. 3.

Figure 26:
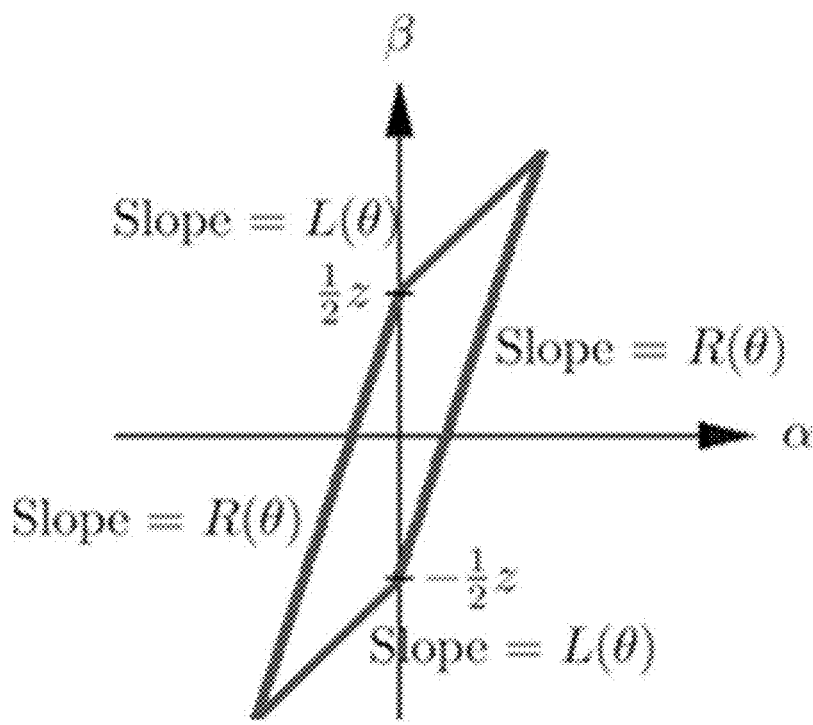

FIG. 26: Tolerance Zone for $\alpha$ and $\beta$

The remaining issue is determining the six dimensional tolerance zone for variation in the parameters of the planar surface, $\delta P$ and $\delta N$, implied by the profile tolerance. This issue is resolved by the application of well known mathematical concepts to the geometry involved and includes knowing the outline of the planar surface.

1.2.1 Finding Upper and Lower Linear Stack for Planes with Profile

The linearized contribution of this planar surface contributor, using a vector $D(\theta)$ parallel to the plane is Eqn. (1):

$$\delta A = \ldots + K_{ori} \cdot \delta N + K_{pos} \cdot \delta P + \ldots$$

$$= \ldots + (K_{ori} \cdot D(\vartheta))\alpha + (K_{pos} \cdot N)\beta + \ldots \quad (7)$$

where $\alpha$ and $\beta$ are limited to the blue parallelogram zone in FIG. 3. The unit vector $D(\theta)$, the coefficient on $\alpha$, and this zone depend upon the angle $\theta$.

The process: Step the values of $\theta$ from 0 radians (0°) to $2\pi$ radians (360°), say in steps of $\pi/180$ (1°), and for each step:

1. Compute the unit vector $D(\theta)$ normal to N.
2. Call the span method at $P_0$ and $D(\theta)$ for this surface to get $L(\theta)$ and $R(\theta)$.
3. Compute the coefficient on $\alpha$, $(K_{ori} \cdot D(\theta))$.
4. At this $\theta$ the upper and lower linear stack will each occur at one of vertices to the blue parallelogram in FIG. 3, so compute the contribution at each of the four vertices, saving the largest and the smallest and where they occurred.

Record the value of $D(\theta)$ as well as the largest and smallest contribution at the angle $\theta$ and values for $\alpha$ and $\beta$ where they occur.

We perform this algorithm for each of the two planes involved in the mating planes constraint, counting the contribution of each plane independently of the other.

1.2.2 Finding the Statistical Stack for Planes with All-Around Profile

A review of the situation. We desire formulas for the contribution to the mean and variance of the analyzed variable due to variations in offset and orientation of a plane.

Eqn. (1) describe the contribution due to variations $\delta N$ in the unit normal and variations $\delta P$ in the offset. The sensitivity coefficients $K_{ori}$ and $K_{pos}$ are the sensitivity coefficients reported by sensitivity analysis.

The actual tolerance specification for a profile tolerance on the plane is given in Eqn. (3).

So, we need to compute the centroid and covariance matrix for a multi-dimensional Gaussian distribution of the contributors to use with Eqn. (7). We do this in several steps:

a) We compute the shape of the multi-dimensional tolerance zone.
b) We compute the centroid and covariance matrix of this multi-dimensional tolerance zone for a uniform distribution.
c) We use this centroid to compute the contribution to the mean of the stack.
d) We scale this covariance matrix to convert it from a covariance matrix for a uniform distribution to a covariance matrix for a multi-dimensional Gaussian distribution.
e) We use this scaled covariance matrix to compute the contribution to the variance of the stack.

1.2.3 Contribution from a Plane with Offset and Orientation

The tolerance zone for offset and orientation has a shape different from the tolerance zone for a profile tolerance. In general, there is no profile tolerance that matches a given offset and orientation tolerance, and there is no offset and orientation tolerance that matches a given profile tolerance.

An offset specification on a plane is in the form of upper and lower specification limits on how far points on the plane can move from its basic position. This tolerance zone is specified by its upper specification limit USL and by its lower specification limit LSL. Both of these limits are measured from the basic plane with positive numbers indicating displacement in the direction of the normal to the plane. Frequently LSL is a negative number, and sometimes USL is also a negative number.

An orientation specification on a plane is in the form of a zone that limits how far the plane can tilt from its basic orientation. This tolerance zone has a specified thickness z and is bounded by two planes both parallel to the basic plane and a distance z apart. The location of this tolerance zone can float within the offset tolerance zone.

FIG. 4 uses the unit vector N normal to the plane, the point $P_o$ which locates the plane, and a vector $D(\theta)$ parallel to the plane used in FIG. 2. But the tolerance zones are for offset and orientation instead of for profile. The basic plane, seen edge on, is the thick black line. The surface span method when Edge View Determined by $\theta$

Figure 27:
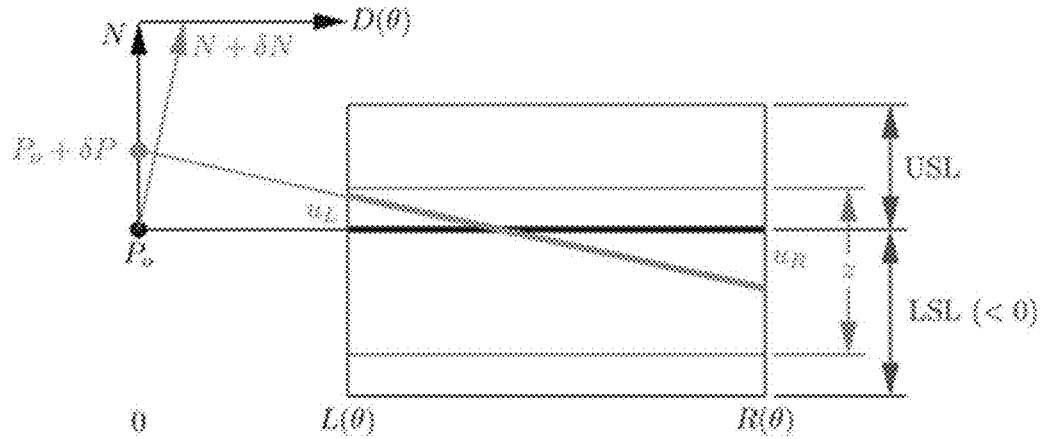

FIG. 27: Edge View called with $P_o$ and $D(\theta)$ would give us the values of $L(\theta)$ and $R(\theta)$ as functions of the angle $\theta$. The point $P_o$ which is used to locate the plane is shown to the left of the Variational Surface, but it can be anywhere relative to the Variational Surface. The values for $L(\theta)$ and $R(\theta)$ can be negative.

The blue rectangle represents the tolerance zone for the offset tolerance specification USL and LSL. The top blue line is the edge view of the plane displaced USL distance from the basic plane in the direction of the vector N normal to the plane. The bottom blue line is the edge view of the plane displaced LSL distance (displayed as if LSL was a negative number) from the basic plane in the direction of the vector N normal to the plane. The offset tolerance is that the points on the surface of this plane must remain between this upper plane and this lower plane.

The pair of green lines represent the orientation tolerance zone for an orientation tolerance specification z. This zone can float within the blue rectangle. The bottom green line is the edge view of a plane parallel to basic plane in the direction of the vector N normal to the plane. The top green line is the edge view of a plane parallel to basic plane displaced from the bottom green line a distance z in the direction of the vector N normal to the plane. The orientation tolerance is that the points on the surface of this plane must remain between this upper plane and this lower plane, but that the offset of these two planes can vary.

The tolerance zone is defined by limits on the values for $u_L$ and $u_R$:

$\text{LSL} \le u_L \le \text{USL}$ from the offset specification $\text{LSL} \le u_R \le \text{USL}$ from the offset specification $-z \le u_R - u_L \le z$ from the orientation specification (8)

The formulas for $u_L$ and $u_R$ given in Eqn. (5) are still valid, so the limits simplify to:

$$\text{LSL} + L(\vartheta)\alpha \le \beta \le \text{USL} + L(\vartheta)\alpha \quad (9)$$
$$\text{LSL} + R(\vartheta)\alpha \le \beta \le \text{USL} + R(\vartheta)\alpha$$
$$\frac{-z}{R(\theta) - L(\theta)} \le \alpha \le \frac{z}{R(\theta) - L(\theta)}$$

Figure 28:
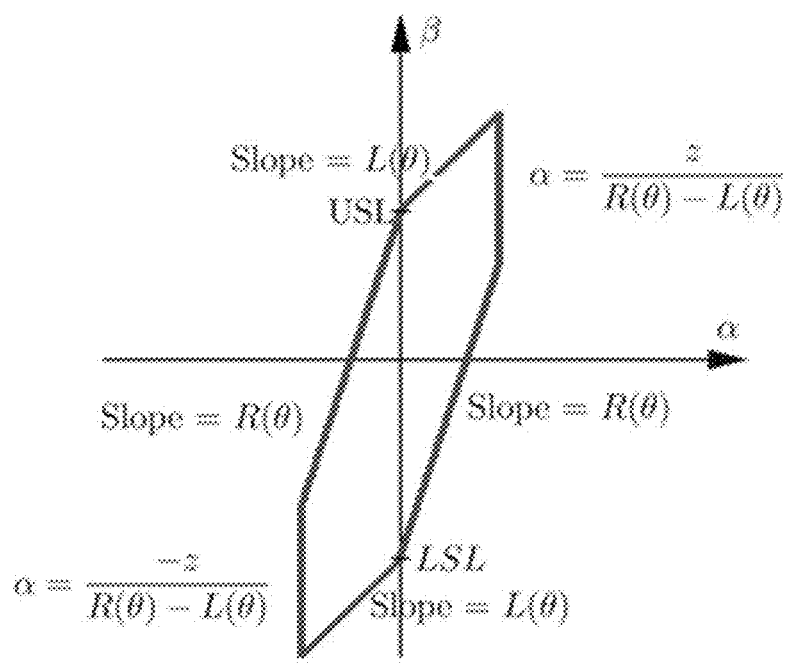

FIG. 28 shows a sample region in the $\alpha$-$\beta$ plane that corresponds to the $L(\theta)$ and $R(\theta)$ shown in FIG. 27.

1.2.4 Finding Upper and Lower Linear Stack for Planes with Offset and Orientation The formula for the stack is Eqn. (7). In terms of $\theta$, $\alpha$, and $\beta$ the formula for the contribution is:

$$\delta A = \ldots + K_\alpha(\vartheta)\alpha + K_\beta\beta + \ldots \quad (10)$$

The proposed algorithm for finding the upper and lower limit stacks are to step $\theta$ around the full circle, say from 0° to 359° inclusive in steps of 1°. At each value of $\theta$:

a) compute $D(\theta)$
b) call the span method to compute $L(\theta)$ and $U(\theta)$
c) Compute the coefficient on $\alpha$, $K_\alpha(\theta) = (K_{ori} \cdot D(\theta))$.
d) compute the value of the contribution at each vertex of the blue hexagon in FIG. 5, remembering the largest and smallest and where the largest and smallest occurred.

1.2.5 Finding Statistical Stack for Planes with Offset and Orientation

A review of the situation. We desire formulas for the contribution to the mean and variance of the analyzed variable due to variations in offset and orientation of a plane.

Eqn. (1) describes the contribution due to variations $\delta N$ in the unit normal and variations $\delta P$ in the offset. The sensitivity coefficients $K_{ori}$ and $K_{pos}$ are the sensitivity coefficients reported by sensitivity analysis.

The actual tolerance specification for a profile tolerance on the plane is given in Eqn. (9). So, we need to compute the centroid and covariance matrix for a multi-dimensional Gaussian distribution of the contributors to use with Eqn. (7). We do this in several steps:

a) We compute the shape of the multi-dimensional tolerance zone.
b) We compute the centroid and covariance matrix of this multi-dimensional tolerance zone for a uniform distribution.

c) We use this centroid to compute the contribution to the mean of the stack.
d) We scale this covariance matrix to convert it from a covariance matrix for a uniform distribution to a covariance matrix for a multi-dimensional Gaussian distribution.
e) We use this scaled covariance matrix to compute the contribution to the variance of the stack.

1.3 Contribution from a Cylinder

A cylinder can be represented by the 3D point at the start of its axis, the 3D point at the end of its axis, a 3D unit vector that is parallel to its axis, the length of its axis, and the diameter of the cylinder.

In the Constraint Server, each cylinder will be represented by:
a) A 3D point S at the start of the axis for this cylinder.
b) A 3D point E at the end of the axis for this cylinder.
c) A 3D direction vector D parallel to the axis for this cylinder.
d) A parameter R for the radius of this cylinder.
e) A parameter L for the length of this cylinder.

Figure 29:
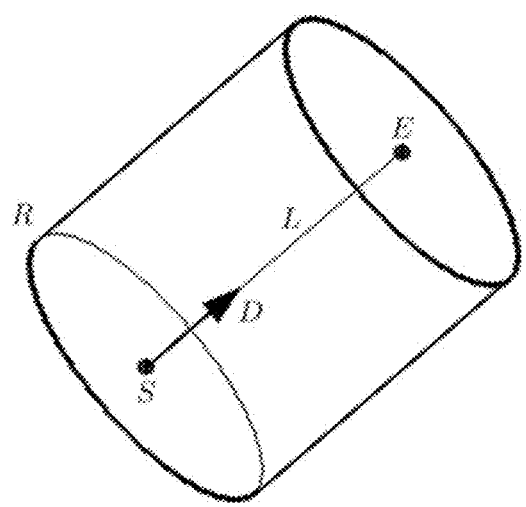

FIG. 29 shows the geometry of a cylinder in the Constraint Server. This is a total of 11 DOF, four more than the intrinsic 7 DOF for a 3D truncated cylinder. There are automatic constraints applied to these parameters:
a) The direction vector D is constrained to have unit length. This is a valence one constraint.

$$\sqrt{D \cdot D} - 1 = 0 \qquad (11)$$

FIG. 29: Parameters for a Cylinder b) The end points S and E, the direction vector D, and the length vector L are related via a 3D line end points constraint. This is a valence three constraint:

$$E - S - L\,D = 0 \qquad (12)$$

These automatic constraints remove 4 DOF leaving a net of 7 DOF, the correct number of DOF for a truncated cylinder.

1.3.1 Contribution from a Cylinder with All-Around Profile

A profile tolerance specification on a cylinder is a number z that represents the thickness of the tolerance zone which consists of the volume between two cylinders coaxial with the basic cylinder, one with a radius ½z (diameter z) less that that of the basic cylinder and the other with a radius ½z (diameter z) greater than that of the basic cylinder. The profile tolerance specifies that all points on the surface of an actual cylinder must lie within this volume.

Figure 30:
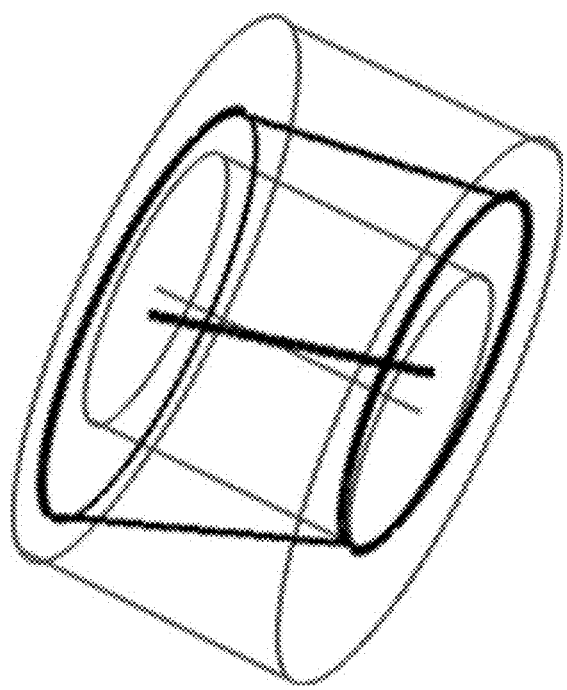

FIG. 30 shows some wireframe geometry for a cylinder with 3D profile specification, using an orthogonal projection. The two blue cylinders are the inner and outer boundaries of the profile tolerance zone. The basic geometry is not displayed but is midway between these two blue cylinders. The black cylinder represents an actual cylinder which lies within this tolerance zone. The circles at each end of the actual cylinder are drawn in the planes at the ends of the basic cylinder. We ignore cosine errors such as these circles actually being slightly out of round ellipses.

The contributions to the tolerance stack A is the 3D vector δS of changes in the point S at the start of the axis, the 3D vector δE of changes in the point E at the end of the axis, the 3D vector δD of changes to the unit vector D parallel to the axis, the change δL to the length L of the axis, and the change δd to the diameter d of the cylinder. In the formula for the linearized stack these contributions are:

$$\delta A = \ldots + K_S \cdot \delta S + K_E \cdot \delta E + K_D \cdot \delta D + K_L \delta L + K_d \delta d + \ldots \qquad (13)$$

where $K_S$ is the 3D vector of sensitivity coefficients for the components of the start of the axis, $K_E$ is the 3D vector of sensitivity coefficients for the end of the axis, $K_D$ is the 3D vector of sensitivity coefficients for the vector parallel to the axis, $K_L$ is the sensitivity coefficient for the length of the axis, and $K_d$ is the sensitivity coefficient for the diameter.

The remaining issue is determining the eleven dimensional tolerance zone for δS, δE, δD, δL and δd implied by the profile tolerance.

This zone simplifies by noting that the component of the changes δS, δE and δD parallel to the vector D will have no impact on the cylinder or its tolerance zone. Changes to the length L also have no impact on the tolerance zone, but the diameter d can have differing effects on the tolerance stack (different values for $K_d$) at each end of the cylinder. This reduces the dimensionality of the tolerance zone from eleven to eight.

1.3.2 Cylindrical Contributors Versus Cylinder Parameters

As with almost all 3D objects, the GD&T definition of the limits implied by the 3D profile specification are not directly the parameters.

If we call the span method on the cylinder using the start of the cylinder axis S and the direction of the cylinder D, we get two numbers α and ω that indicate the limits of the material on the surface of the cylinder. These two numbers represent an interval along the axis of the cylinder.

Figure 31:

The possible relationship between this interval and the axis of the cylinder is shown graphically in FIG. 31, illustrating the Active Region of the Axis of the Cylinder.

The actual parameters to the tolerance stack are:

$$\vec{u}_\alpha = H_\alpha - P_\alpha$$

$$\vec{u}_\omega = H_\omega - P_\omega$$

$$d_\alpha = \text{diameter at } \alpha$$

$$d_\omega = \text{diameter at } \omega \qquad (14)$$

where:
1. $H_\alpha$ = the point on the axis of the basic cylinder at α. The formula for $H_\alpha$ is:

$$H_\alpha = S + \alpha D \qquad (15)$$

2. $H_\omega$ = the point on the axis of the basic cylinder at ω. The formula for $H_\omega$ is:

$$H_\omega = S + \omega D \qquad (16)$$

3. $P_\alpha$ = a point on the axis of the actual cylinder α. $P_\alpha$ is the point where the axis of the actual cylinder intersects the plane normal to D and through the point $H_\alpha$.

$$P_\alpha = S_A + \frac{D \cdot (H_\alpha - S)}{D \cdot D_A} D_A \qquad (17)$$

4. $P_\omega$ = a point on the axis of the actual cylinder at ω. $P_\omega$ is the point where the axis of the actual cylinder intersects the plane normal to D and through the point $H_\omega$.

$$P_\omega = S_A + \frac{D \cdot (H_\omega - S)}{D \cdot D_A} D_A \qquad (18)$$

5. The contributor $\vec{u}_\alpha$ is the difference between the two points at $\alpha$.

6. The contributor $\vec{u}_\omega$ is the difference between the two points at $\omega$.

The goal is to represent the contribution to the tolerance stack as:

$$\text{contribution} = K_\alpha \cdot \vec{u}_\alpha K_\omega \cdot + K_{d\alpha} \delta d_\alpha + \vec{u}_{d\omega} \delta d_\omega \quad (19)$$

where $K_\alpha$, $K_\omega$, $K_{d\alpha}$, and $K_{d\omega}$ are the partial derivatives of the analyzed variable A with respect to the contributors $\sim u_\alpha$ and $\sim u_\omega$ respectively.

When we determine the parameters $S=d_S=f_S(\vec{u}_\alpha, \vec{u}_\omega)$, $E=f_E(\vec{u}_\alpha, \vec{u}_\omega)$, $D=f_D(\vec{u}_\alpha, \vec{u}_\omega)$, $L=f_L(\vec{u}_\alpha, \vec{u}_\omega)$, $f_{dS}(d_\alpha, d_\omega)$, and $d_E=f_{dE}(d_\alpha, d_\omega)$ as functions of the contributors we $\vec{u}_\alpha$, $\vec{u}_\omega$, $d_\alpha$, and $d_\omega$ can use the Chain Rule of Calculus [?] to convert the sensitivity coefficients with respect to the parameters into the sensitivity coefficients with respect to the contributors.

1.3.3 Cylinder Parameters as Functions of the Cylindrical Contributors

This section will use the equations Eqn. (14), Eqn. (15), Eqn. (16), Eqn. (17), and Eqn. (18) to derive formulas for those 3 by 3 Jacobian matrices used by the Chain rule.

$\vec{u}_\alpha$ and $\vec{u}_\omega$

Figure 32:
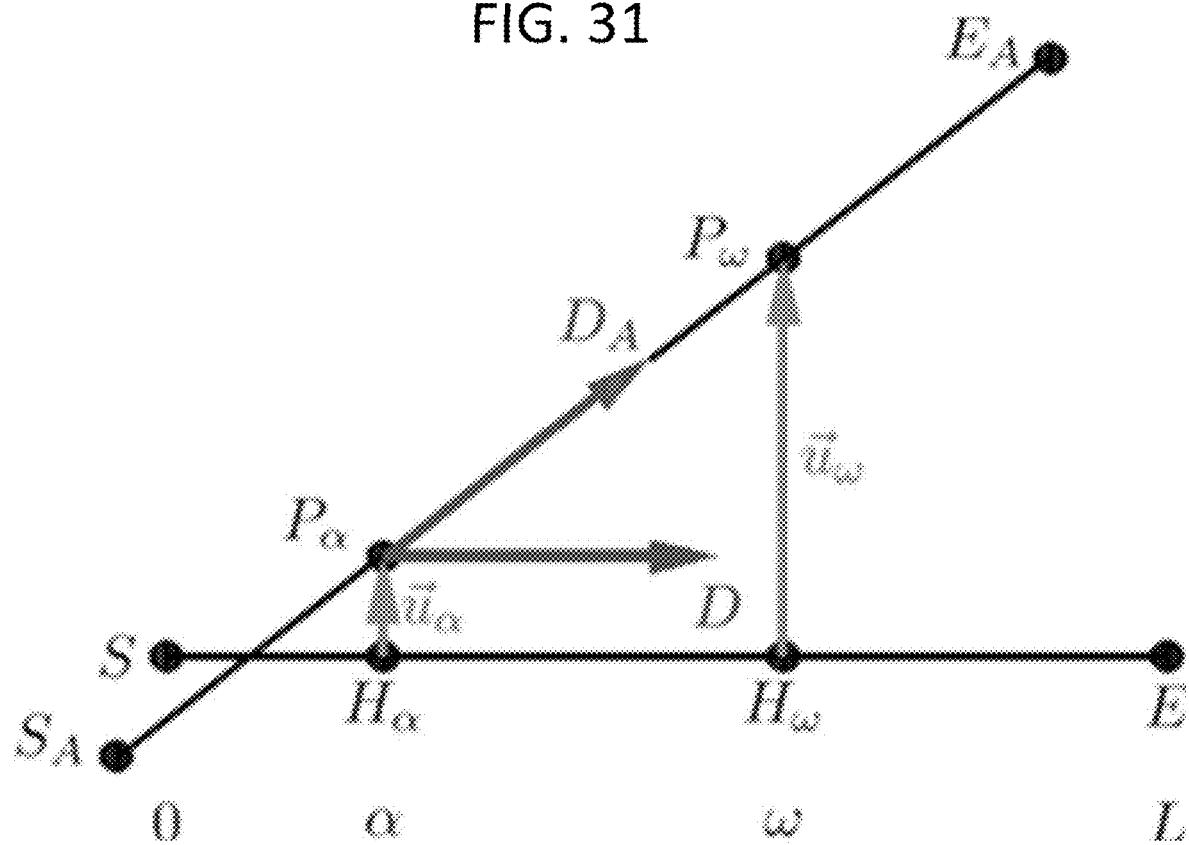

FIG. 32 is a representation of both the contributors in red and the parameters S, E, and L in black. The direction vector D is in blue. The ends of the actual cylinder axis have been arbitrarily changed so we will not confuse the picture by having to many entities in close proximity.

FIG. 32: Actual Parameters and Contributors 1.3.4 The Direction Vector
An inspection of FIG. 32 gives us:

$$D_A = \quad (20)$$

$$f_D(\vec{u}_\alpha, \vec{u}_\omega) = \frac{P_\omega - P_\alpha}{|P_\omega - P_\alpha|} = \frac{H_\omega + \vec{u}_\omega - H_\alpha - \vec{u}_\alpha}{|H_\omega + \vec{u}_\omega - H_\alpha - \vec{u}_\alpha|} = \frac{D + \frac{\vec{u}_\omega - \vec{u}_\alpha}{(\omega - \alpha)}}{\left|D + \frac{\vec{u}_\omega - \vec{u}_\alpha}{(\omega - \alpha)}\right|}$$

using Eqn. (15) and Eqn. (16) to simplify.

1.3.5 The End Points

The actual start and end points $S_A$ and $E_A$ are on the line connecting the actual points $P_\alpha$ and $P_\omega$. For some numbers $\tau_S$ and $\tau_E$ the actual start and end points are:

$$S_A = P_\alpha + \tau_S(P_\omega - P_\alpha)$$

$$E_A = P_\alpha + \tau_E(P_\omega - P_\alpha) \quad (21)$$

We want the actual start and end points $S_A$ and $E_A$ to be in the planes perpendicular to the basic direction D:

$$D \cdot (S_A - S) = 0$$

$$D \cdot (E_A - E) = 0 \quad (22)$$

Eqn. (21) and Eqn. (22) gives values for $\tau_S$ and $\tau_E$:

$$\tau_S = \frac{-\alpha}{\omega - \alpha} \quad (23)$$

$$\tau_E = \frac{L - \alpha}{\omega - \alpha}$$

and the formulae for the end points become:

$$S_A = f_S(u_\alpha, u_\omega) = S + \frac{\omega}{\omega - \alpha} u_\alpha - \frac{\alpha}{\omega - \alpha} u_\omega \quad (24)$$

$$E_A = f_E(u_\alpha, u_\omega) = E - \frac{(L - \omega)}{\omega - \alpha} u_\alpha + \frac{(L - \alpha)}{\omega - \alpha} u_\omega$$

1.3.6 The Two Diameters

Figure 33:
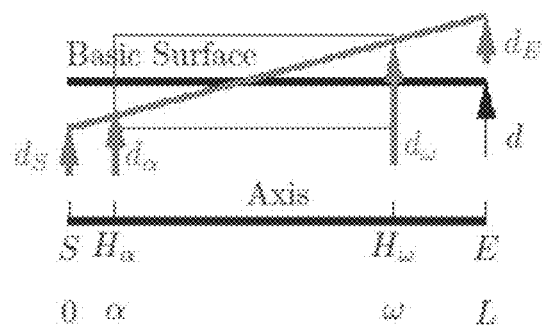
Figure 34:
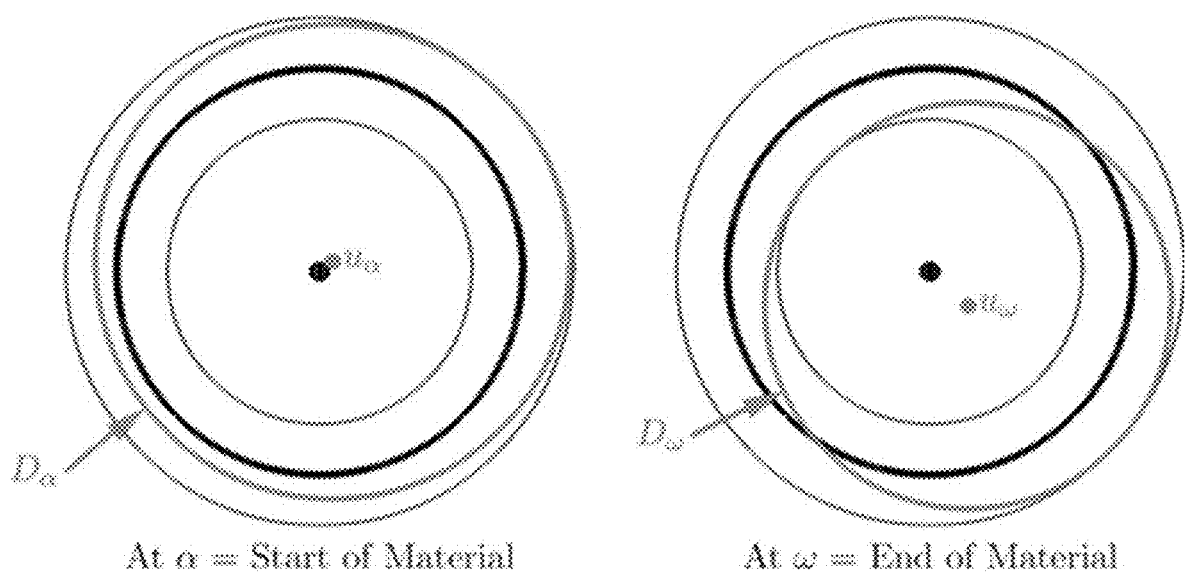

FIG. 33 shows how we allow the diameter of the cylinder to vary along its axis. The basic diameter is the constant d denoted by the thick horizontal black line. The actual radius can vary linearly along the axis as denoted by the slanted red line with radius $d_S$ at the start of the cylinder and radius $d_E$ at the end of the cylinder. $d_S$ and $d_E$ are the parameters used in the sensitivity analysis. The actual contributors are $d_\alpha$ at the point $\alpha$ where the material for the cylinder begins and $d_\omega$ at the point $\omega$ where the material for the cylinder ends. The profile tolerance zone is denoted by the blue box.

We use FIG. 33 (illustrating how the diameter varies along the axis) to derive the parameters $d_S$ and $d_E$ in terms of the contributors $d_\alpha$ and $d_\omega$.

1.3.7 The Shape of the Tolerance Zone for Cylindrical Profile

FIG. 11 is looking straight on the planes at $\alpha$ on the left and $\omega$ on the right. The two thick black circles are the basic geometry at each end of the cylinder. Both of these circles have the same diameter, the basic diameter of the cylinder. The four thin blue circles are the boundaries of the tolerance zone at each end. The two red circles represent an example of an actual circle which satisfies the profile tolerance at each end. At the $\alpha$ end of the cylinder the contributors are the displacement $u_\alpha$ (a 3D vector) from the center of the black circle and the diameter of the circle is $d_\alpha$. At the $\omega$ end of the cylinder the contributors are the displacement $u_\omega$ (a 3D vector) from the center of the black circle and the diameter of the circle is $d_\omega$.

Rather than repeat everything twice, the following applies to each end of the cylinder with the 3D vector $u_A$ being either:

When looking at the start of the cylinder $u_A = u_\alpha$ and $d_A = d_\alpha$.

When looking at the end of the cylinder $u_A = u_\omega$ and $d_A = d_\omega$.

Part of the profile tolerance specification is that the red circle has to remain inside the outer blue circle which has diameter $d + z$ where $z$ is the profile tolerance specification.

Figure 35:
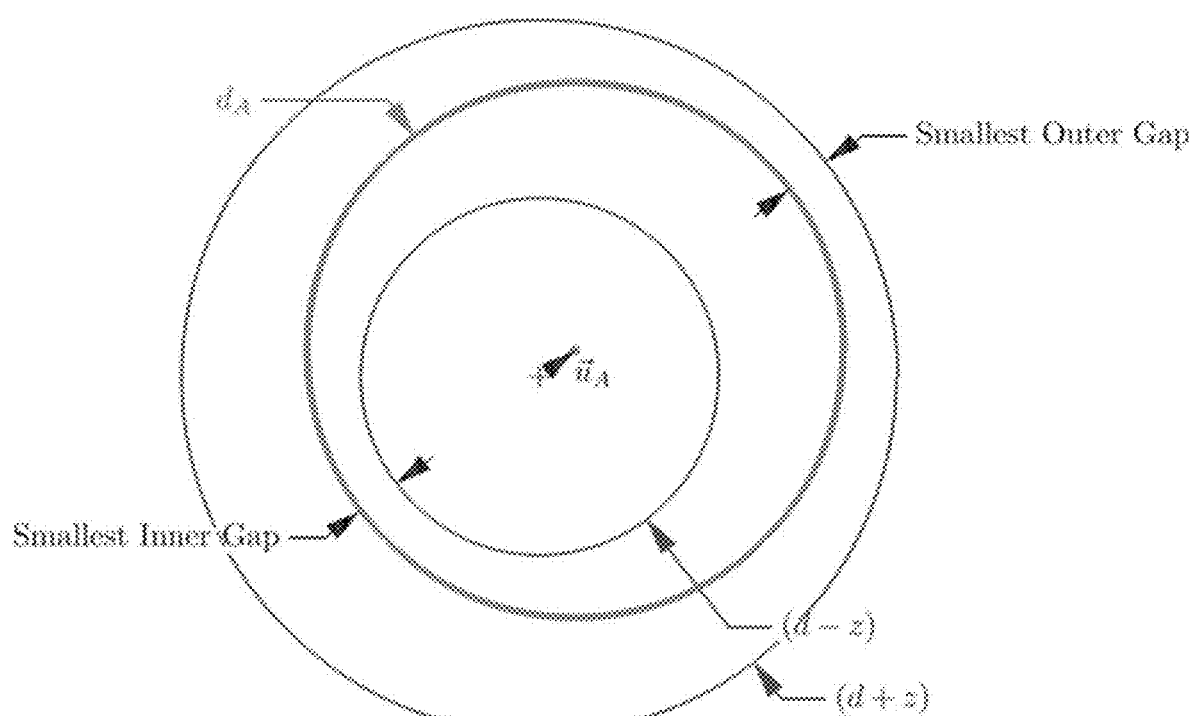

The formula for the smallest outer gap, the smallest gap between the outer blue circle and the actual circle (reference FIG. 35) is:

Smallest Outer Gap $= \frac{1}{2}(d + z - d_A) - |u_A|$ (25)

where $|u_A|$ is the length of the 3D vector $\vec{u}_A$. The condition that the red circle remain inside the outer blue circle is that the value for the smallest outer gap cannot be negative:

$$\tfrac{1}{2}(d + z - d_A) - |u_A| \geq 0 \quad (26)$$

The rest of the profile tolerance specification is that the red circle has to remain outside the inner blue circle which has diameter $d - \frac{1}{2}z$ where $z$ is the profile tolerance specification. The formula for the smallest inner gap between the actual circle and the inner circle (reference FIG. 35) is:

$$\text{Smallest Inner Gap} = \tfrac{1}{2}(d_A - d + z) - |u_A| \tag{27}$$

The condition that the red circle remain outside the inner blue circle is that the value for the smallest inner gap cannot be negative:

$$\tfrac{1}{2}(d_A - d + z) - |u_A| \geq 0 \tag{28}$$

1.3.8 Finding Upper and Lower Linear Stack for Cylindrical Profile

The combinations of $(d_A - d)$ and $|u_A|$ which satisfy both Eqn. (26) and Eqn. (28) are those points inside the triangle in FIG. 36 (Tolerance Zone for Profile). We are interested in the largest and smallest possible contribution subject to the limits imposed by the profile tolerance specification, where the contribution is:

$$\text{contribution} = K_A \cdot u_A + K_d(d_A - d) \tag{29}$$

The largest and smallest contribution is computed both at the $\alpha$ end of the cylinder and at the $\omega$ end of the cylinder.

The Cauchy-Schwartz inequality says that when the tolerance zone is circular the largest value for $K_A \cdot u_A$ is $+|K_A| |u_A|$ which occurs when $u_A$ is parallel to $K_A$. And the smallest value for $K_A \cdot u_A$ is $-|K_A| |u_A|$ which occurs when $u_A$ is antiparallel to $K_A$.

If $K_A$ is not a zero vector, then we let $u_A$ be parallel to $K_A$:

$$u_A = \beta \frac{K_A}{|K_A|} \tag{30}$$

where $\beta$ is some number to be determined. When $\beta > 0$ the vector $u_A$ is parallel to $K_A$ as the two vectors point in the same direction. When $\beta < 0$, the vector $u_A$ is anti-parallel to $K_A$ as the two vectors point in opposite directions. The contribution of this end of the cylinder to the limit stack is:

$$\text{contribution} = K_A \cdot u_A + K_d(d_A - d) = \tag{31}$$
$$K_A \cdot \beta \frac{K_A}{|K_A|} + K_d(d_A - d) = \beta |K_A| + K_d(d_A - d)$$

But

Eqn. (31)

$$-\tfrac{1}{2} z \leq \beta \leq \tfrac{1}{2} z \text{ so becomes contribution} = \pm \tfrac{1}{2} z |K_A| + K_d(d_A - d) \tag{32}$$

becomes

Figure 36:
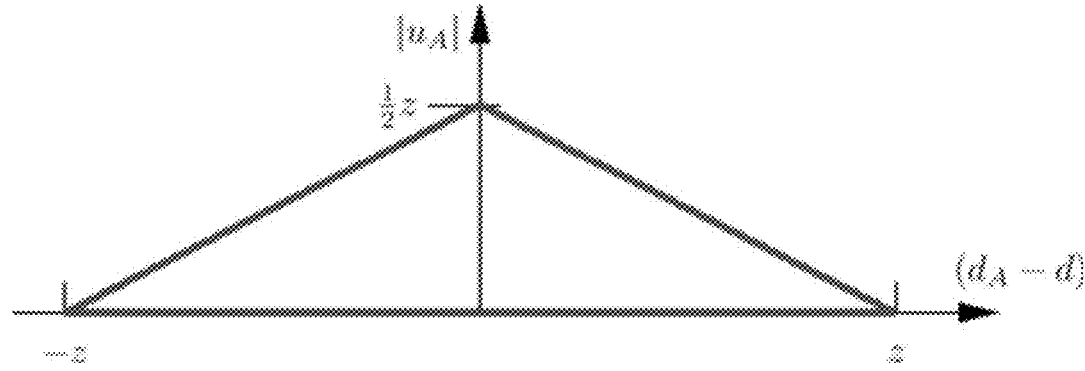

The maximum contribution to this limit stack will occur at one of the three vertices of that triangle in FIG. 36. Simply compute all three and save the largest and smallest contributions and where they occurred.

1.3.9 Finding Statistical Stack for Cylindrical Profile

A review of the situation. We desire formulas for the contribution to the mean and variance of the analyzed variable due to variations in offset and orientation of a cylinder. This process is very similar to that used in section § 1.2.2 for planes and is not described in detail here.

1.3.10 Contribution of a Cylinder with Size and Position

A cylinder may have the same representation for size and position as for profile, section § 1.3.1. But the different tolerance specification results in a different shape for the tolerance zone.

A size and position specification on a cylinder is a set of several numbers:
1. Two numbers USL and LSL representing the upper and lower specification limits on the size (diameter) of the cylinder. In this section, the diameters of an actual cylinder at each end have to lie between these two limits.
2. A number $z_p$ representing the tolerance specification on the true position of the axis of the cylinder.
3. A modifier of this position tolerance, one of RFS (Regardless of Feature Size), MMB (applies at Maximum Material Boundary), or LMB (applies at Least Material Boundary). When no modifier is given, we will assume RFS.
    Depending on the size of an actual cylinder and whether it is a pin or a hole, there is number z between $z_p$ and $z_p + (USL-LSL)$ such that the axis of the actual cylinder has to lie inside a cylinder with diameter z that is coaxial with the basic cylinder.

Figure 37:
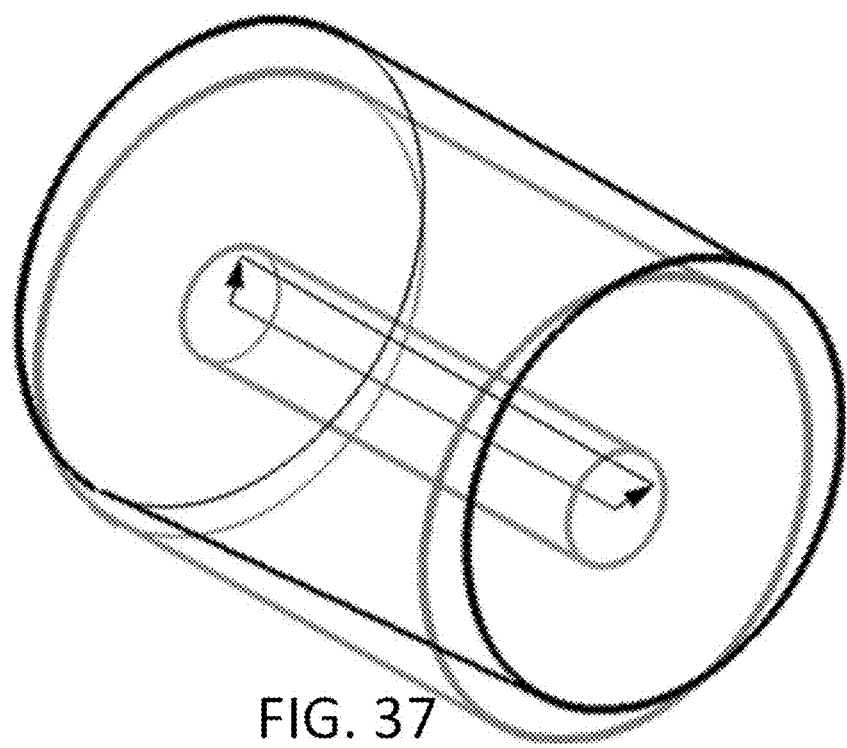

FIG. 37 shows a wireframe view of most of the pertinent geometry. This figure is cluttered because there is a lot of pertinent geometry. The green cylinder is the basic cylinder. The black cylinder is an actual cylinder (actually a cone with diameter 42 at its start and diameter 39 at its end). The tolerance 510 zone for the size of this cylinder is not shown as it would excessively clutter up this already cluttered view. The red cylinder, coaxial with the basic cylinder and with diameter equal to the position tolerance $z_p$ plus any bonus tolerance from a material condition, is the tolerance zone for the position specification.

If we use a standard CAD algorithm to compute two vectors $\vec{i}$ and $\vec{j}$ so that the three vectors $\vec{i}$-$\vec{j}$-$\vec{D}$ form a right handed orthonormal coordinate system, where $\vec{D}$ is the direction vector parallel to the basic cylinder.
1. $u_0$=the offset from the actual axis to the basic axis in the $\vec{i}$ direction at the start of the basic cylinder.
2. $u_1$=the offset from the actual axis to the basic axis in the $\vec{j}$ direction at the start of the basic cylinder.
    The displacement between the axis of the actual cylinder and the axis of the basic cylinder at the start of the cylinder is $\vec{u}_\alpha$ the vector where:

$$\vec{u}_\alpha = u_0 \vec{i} + u_1 \vec{j} \tag{33}$$

3. $u_2$=the difference between the diameter $d_\alpha$ of the actual cylinder at the start and the diameter d of the basic cylinder.
4. $u_3$=the offset from the actual axis to the basic axis in the $\vec{i}$ direction at the end of the basic cylinder.
5. $u_4$=the offset from the actual axis to the basic axis in the $\vec{j}$ direction at the end of the basic cylinder.
    The displacement between the axis of the actual cylinder and the axis of the basic cylinder at the end of the cylinder is the vector $\sim u_\omega$ where:

$$\vec{u}_\omega = u_3 \vec{i} + u_4 \vec{j} \tag{34}$$

6. $u_5$=the difference between the diameter $d_\omega$ of the actual cylinder at the end and the diameter d of the basic cylinder.

The start and end of the basic cylinder are the ends of the active region as determined as in section § 1.3.2.

Figure 38:
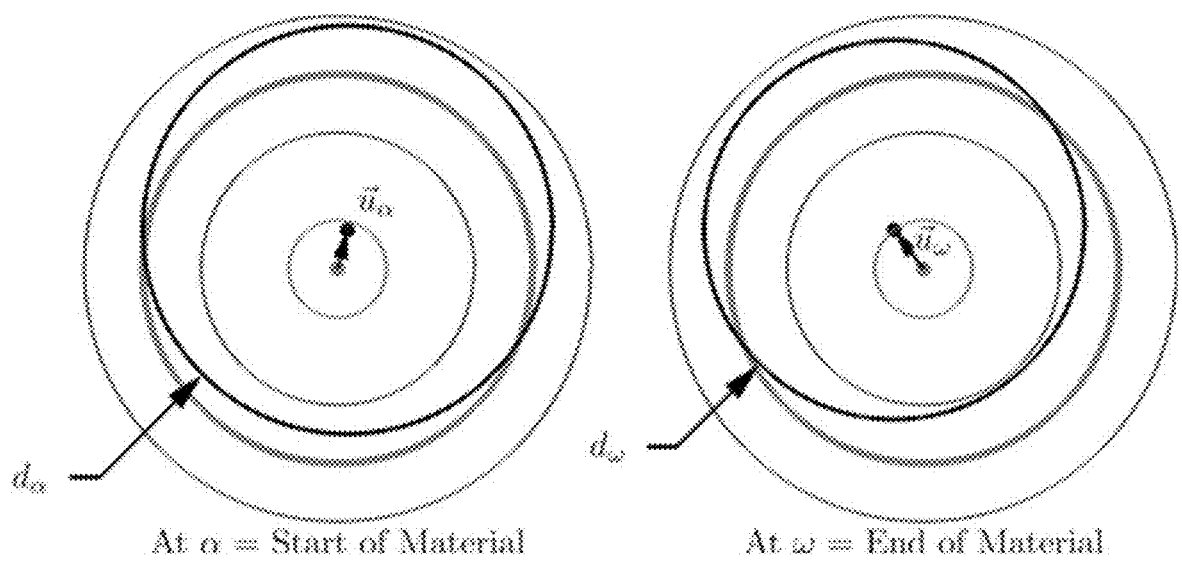

FIG. 38 shows the same geometry in FIG. 37 in two planes perpendicular to the basic cylinder, one plane at each end of the active region of the basic cylinder, where the two error vectors are given by Eqn. (33) at the start and Eqn. (34) at the end.

The green circles are the ends of the basic cylinder. The large blue circles are the limits of size at each end of the basic cylinder. The red circles are the ends of the position tolerance zone.

The size and position tolerance specifications put the following limits on the six contributors:

$$\sqrt{u_0^2+u_1^2} \leq \tfrac{1}{2}z_1 \text{ Position at start}$$

$$LSL \leq u_2 \leq USL \text{ size at start}$$

$$\sqrt{u_3^2+u_4^2} \leq \tfrac{1}{2}z_1 \text{ Position at end}$$

$$LSL \leq u_5 \leq USL \text{ size at end} \tag{35}$$

where the diameter of the tolerance zone $z_1$ depends upon the material condition:

When the specification is RFS, $z_1=z_p$, the position specification.

When the specification is a hole at MMB, $z_1=z_p+(d_A-LSL)$, the position specification plus the bonus tolerance. Here, $d_A$ is the diameter of the actual cylinder (assumed to lie within the limits of size) and LSL is the maximum material size of the hole.

When the specification is a pin at MMB, $z_1=z_p+(USL-d_A)$, the position specification plus the bonus tolerance. Here, $d_A$ is the diameter of the actual cylinder (assumed to lie within the limits of size) and USL is the maximum material size of the pin.

When the specification is a hole at LMB, $z_1=z_p+(USL-d_A)$, the position specification plus the bonus tolerance. Here, $d_A$ is the diameter of the actual cylinder (assumed to lie within the limits of size) and USL is the least material size of the hole.

When the specification is a pin at LMB, $z_1=z_p+(d_A-LSL)$, the position specification plus the bonus tolerance. Here, $d_A$ is the diameter of the actual cylinder (assumed to lie within the limits of size) and LSL is the least material size of the pin.

1.3.11 The Shape of the Tolerance Zone of Cylindrical Profiles

FIG. 38 is looking straight on the planes at the start of the cylinder α on the left and at the end of the cylinder ω on the right.

Rather than repeat everything twice, the following applies to each end of the $\vec{u}_A$ cylinder $\vec{u}_\alpha$ with the 3D vector being either when $\vec{u}_\omega$ looking at the start of the cylinder or when looking at the end of the cylinder. Likewise, $d_A$ is either $d_\alpha=u_2$ when looking at the start of the cylinder or $d_\omega=u_5$ when looking at the end of the cylinder.

The position tolerance specification is that the $\vec{u}_A$ vector has to lie within red circle:

$$|\vec{u}_A| \leq \tfrac{1}{2}(z_p+\text{Bonus Tolerance}) \tag{36}$$

where $|\vec{u}_A|$ is the length of the 3D vector $\vec{u}_A$. The value for ½ Bonus Tolerance is:

zero when the position specification is RFS.

when the cylinder is a hole at MMB or a pin at LMC:

$$\text{Bonus Tolerance}=d_A-LSL \tag{37}$$

when the cylinder is a pin at MMB or a hole at LMC:

$$\text{Bonus Tolerance}=USL-d_A \tag{38}$$

The actual diameter $d+d_A$ always has to satisfy:

$$LSL \leq d_A \leq USL \tag{39}$$

1.3.12 Tolerance Zone for Cylindrical Profiles with Size and Position RFS

The combinations of $d_A$ and $|u_A|$ which satisfy Eqn. (35) when the position of the cylinder is RFS are those points inside the rectangle in FIG. 39. This holds whether the cylinder is a pin or a hole.

1.3.13 Finding Upper and Lower Linear Stack for Cylindrical Profiles RFS

We are interested in the largest and smallest possible contribution subject to the limits imposed by the profile tolerance specification, where the contribution is:

$$\text{contribution}=K_A \cdot u_A + K_d d_A \tag{40}$$

The limit stack computations are performed at both the α end of the cylinder and at the ω end of the cylinder.

The Cauchy-Schwartz inequality [?] says that when the tolerance zone is circular the largest value for $K_A \cdot u_A$ is $+|K_A| |u_A|$ which occurs when $u_A$ is parallel to $K_A$. And the smallest value for $K_A \cdot u_A$ is $-|K_A| |u_A|$ which occurs when $u_A$ is antiparallel to $K_A$.

Figure 39:
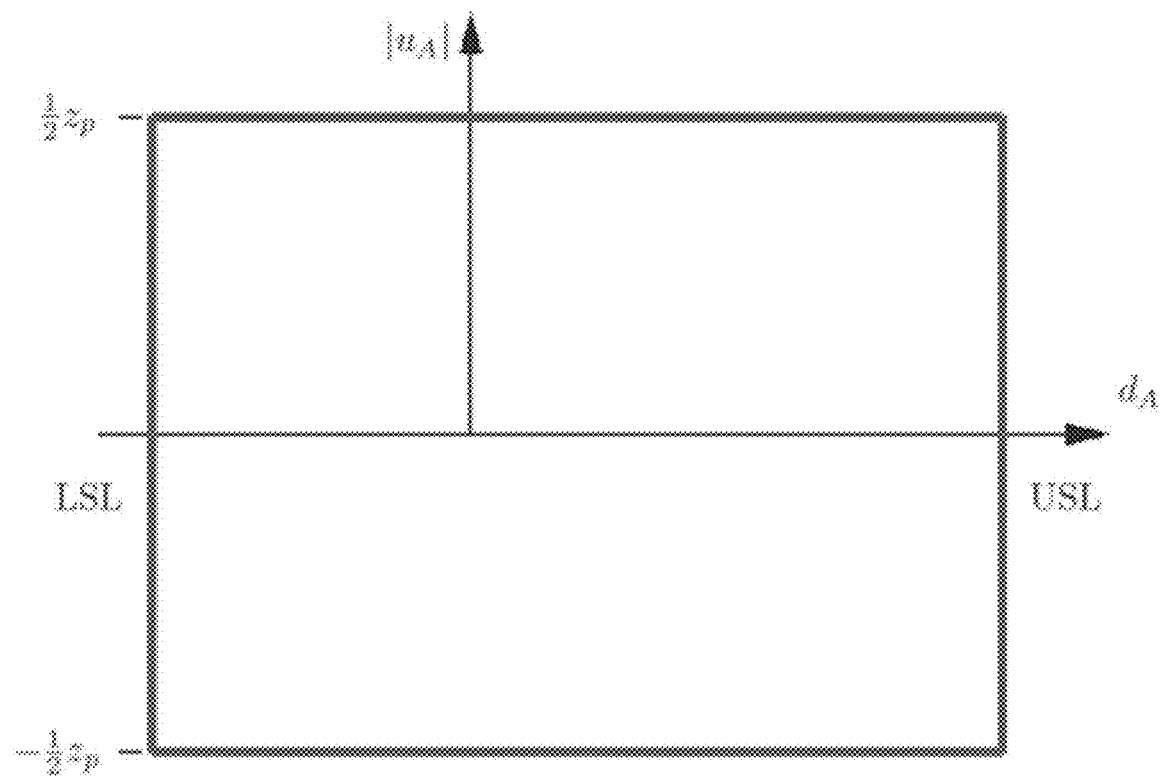

The maximum contribution to this limit stack will occur at one of the four vertices of the largest rectangle in FIG. 39.

1.4 Mating Constraints

The various parts in an assembly are connected to each other via mating constraints. The user creates a mating constraint by selecting the appropriate tool then selecting surfaces on each of a plurality of parts. Constraints are added to the model which will cause these surfaces to be mated in the assembly.

This disclosure is amenable to numerous mating constraints, including these general categories:

a) Those based on planes such as mating planes, parallel planes, perpendicular planes, and tab in slot.

b) Those based on cylindrical surfaces such as pin in hole, virtual bolt, and compound pin in hole.

c) Those based on points such as point-on-plane, point-on-cylinder, and point-coincident-with-point.

d) Those based on spherical surfaces such as ball in socket.

Those based on complex surfaces such as NURBS surfaces.

Those based on mating different types of surfaces (e.g., cylinder-tangent-to-plane, sphere-tangent-to-plane, sphere-tangent-to-cylinder, plane-tangent-to-NURBS-surface).

This list is provided for illustrative purposes, and is not comprehensive.

Each mating constraint contains within itself surface definitions amenable to simulating variation of the constrained surfaces within tolerance limits applicable to each surface. Using the self-contained surface definitions the constraints create their own overlay surfaces. The overlay surfaces are subsequently used to simulate variation. Users may visually observe the effects of the surface variations by selecting the constraints and choosing perturb options such as perturbing in an offset direction, perturbing orientation, etc. Perturb options depend on the type of surface constrained by the mating constraint. The overlay surfaces are also used with the constraints to compute the tolerance analysis results for stacks.

1.5 Effects of Datum Selection

This disclosure allows the user to select a surface on an instance in the assembly and seeing the impact on a stack of making that surface in the master part a primary, secondary, or tertiary datum.

Certain surfaces could reduce the tolerance stack if they were datums. Being a datum surface used to position and orient the datum reference frame, some of the variation in the position and orientation of the surface would not contribute to the stack. This is because the Datum Reference Frame would be adjusted to compensate for variation in the surface.

For example, any tilt to a planar surface that is the primary datum for the master part would be compensated for by a comparable tilt in the Datum Reference Frame. The contribution to a stack by any tilt to a planar surface that is the secondary datum for the master part would be reduced because only the tilt in the direction controlled by the primary datum would be a contributor—tilt in other directions would be compensated for by a comparable tilt in the Datum Reference Frame.

The surface being a datum controls some directions of variation but not others. We can simulate this by restricting the variation in position and/or orientation of the surface to those directions of variation not controlled by the datum surface, and we can accomplish this by adjusting the sensitivity vectors.

After adjusting the sensitivity vectors, we compute the contributions to the stack in the normal manner for that surface. The complication is that the directions controlled by a surface being a datum depends upon the datum case and which surfaces are primary (for secondary and tertiary datums) and secondary (for tertiary datums).

The datum precedence (primary, secondary, and tertiary) in the feature control frame determines which datums control each of the directions of variation. The primary datum controls three or more of the directions of variation. The secondary datum, if specified, controls additional directions of variation that were not previously controlled by the primary datum. In some cases (for example, two orthogonal axes), two datums are sufficient to fully control the datum reference frame. In such cases, a third datum cannot be meaningfully applied. Otherwise, the tertiary datum, if specified, controls the balance of the directions of variation that were not previously controlled by the primary and secondary datums.

There are only six types of geometry which have meaning when used as datums:
1. points such as the center of spherical surfaces or a single datum target.
2. axes such as the centerlines of cylinders or cones, pairs of coaxial cylinders or cones, or two noncoincident datum targets.
3. planes such as planar surfaces, pairs of opposed planar surfaces, or three non-collinear datum targets.
4. axis and a point such as a cone.
5. axis and a plane such as an extrusion.
6. a complex surface.

The following sections describe the mathematical derivations of several of these combinations of surface datums.

1.5.1 Representation of Planar Datum Surfaces

A plane is represented by a point $\overline{P}_o$ somewhere on the plane and a vector $\vec{N}_o$ normal to the plane. The sensitivity coefficients are a vector $\vec{K}_o$ with respect to the position $\overline{P}_o$ and a vector $\vec{V}_o$ with respect to the orientation $\vec{N}_o$. We call these two vectors the position sensitivity vector $\vec{K}_o$ and the orientation sensitivity vector $\vec{V}_o$.

1.5.2 Representation of Axial Datum Surfaces (Cylinders)

A cylinder is represented by its radius $r_o$ and the end $\overline{E}_o$ and start $\overline{S}_o$ points of its axis. But the tolerance stack considerations use a position $\overline{P}_o$ and orientation $\vec{N}_o$ where:

$$\overline{P}_o = \frac{1}{2}(\overline{E}_o + \overline{S}_o) \qquad (41)$$

$$\vec{N}_o = \frac{\overline{E}_o - \overline{S}_o}{L}$$

$$L = |\overline{E}_o - \overline{S}_o|$$

where L is the length of the axis of the cylinder.

Many of the computations in this section involve the solution for the end $\overline{E}_o$ and start $\overline{S}_o$ points in terms of the position $\overline{P}_o$ and orientation $\vec{N}_o$:

$$\overline{E}_o = \overline{P}_o + \tfrac{1}{2} L\, \vec{N}_o$$

$$\overline{S}_o = \overline{P}_o - \tfrac{1}{2} L\, \vec{N}_o \qquad (42)$$

The sensitivity analysis for the analyzed variable A gives the sensitivity coefficients with respect to the end and start points of the axis:

$$\vec{K}_{0E} = \frac{\partial A}{\partial \overline{E}_o} \qquad (43)$$

$$\vec{K}_{0S} = \frac{\partial A}{\partial \overline{S}_o}$$

The chain rule of calculus gives us the sensitivity coefficients with respect to the position and orientation of the axis:

$$\vec{K}_{0P} = \frac{\partial A}{\partial \overline{P}_o} = \frac{\partial A}{\partial \overline{E}_o}\frac{\partial \overline{E}_o}{\partial \overline{P}_o} + \frac{\partial A}{\partial \overline{S}_o}\frac{\partial \overline{S}_o}{\partial \overline{P}_o} = \vec{K}_{0E} + \vec{K}_{0S} \qquad (44)$$

$$\vec{K}_{0N} = \frac{\partial A}{\partial \vec{N}_o} = \frac{\partial A}{\partial \overline{E}_o}\frac{\partial \overline{E}_o}{\partial \vec{N}_o} + \frac{\partial A}{\partial \overline{S}_o}\frac{\partial \overline{S}_o}{\partial \vec{N}_o} = \frac{1}{2}L(\vec{K}_{0E} - \vec{K}_{0S})$$

Once the sensitivity vectors $\vec{K}_{0P}$ and $\vec{K}_{0N}$ have been modified to $\vec{K}_{1P}$ and $\vec{K}_{1N}$, we may need to translate these modifications back to the sensitivities with respect to the start and end points:

$$\vec{K}_{1E} = \frac{\partial A}{\partial \overline{E}'_o} = \frac{\partial A}{\partial \overline{P}'_o}\frac{\partial \overline{P}'_o}{\partial \overline{E}'_o} + \frac{\partial A}{\partial \vec{N}'_o}\frac{\partial \vec{N}'_o}{\partial \overline{E}'_o} = \frac{1}{2}\left(\vec{K}_{1P} + \frac{1}{L}\vec{K}_{1N}\right) \qquad (45)$$

$$\vec{K}_{1S} = \frac{\partial A}{\partial \overline{S}'_o} = \frac{\partial A}{\partial \overline{P}'_o}\frac{\partial \overline{P}'_o}{\partial \overline{S}'_o} + \frac{\partial A}{\partial \vec{N}'_o}\frac{\partial \vec{N}'_o}{\partial \overline{S}'_o} = \frac{1}{2}\left(\vec{K}_{1P} - \frac{1}{L}\vec{K}_{1N}\right)$$

In summary, when adjusting the sensitivities for an axial datum, first compute the position and orientation then compute the sensitivities with respect to position and orientation, and finally (if necessary) compute the modified sensitivities with respect to the start and end.

1.5.3 Planar Surfaces as Primary Datum

Since there are no directions of variation controlled by this datum surface that are controlled by another datum surface, replace the orientation and position sensitivity vectors for this surface with zero. That is, use the $\vec{K}_1$ position sensitivity vector and $\vec{V}_1$ the orientation sensitivity vector $\vec{K}_o$ in $\vec{V}_o$ place of the computed vectors and where:

$$\vec{K}_1 = 0$$

$$\vec{V}_1 = 0 \tag{46}$$

1.5.4 Planar Secondary Datum with Planar Primary Datum

Since one orientation direction of variation controlled by this datum surface is controlled by the primary datum surface, adjust the orientation sensitivity coefficients. Replace the position sensitivity coefficient with zero. That is, use $\vec{K}_1$ the position sensitivity $\vec{V}_1$ $\vec{K}_o$ $\vec{V}_o$ vector and the orientation sensitivity vector in place of the computed vectors and where:

$$\vec{K}_1 = 0 \tag{47}$$

$$\vec{V}_1 = \frac{(\vec{V}_o \cdot \vec{d})}{(\vec{d} \cdot \vec{d})} \vec{d}$$

where $$\vec{d} = \vec{N}_1 - (\vec{N}_1 \cdot \vec{N}_2) \vec{N}_2 \tag{48}$$

and $\vec{N}_1$ is the normal to the primary plane and $\vec{N}_2$ is the normal to the secondary plane. The derivation of these two equations follows below.

Setting the position sensitivity to zero is obvious—the datum reference frame for the part will adjust to match the position of this secondary datum surface.

Being a secondary datum, there are two directions involved:

1. $\vec{N}_1$ = the normal to the plane of the primary datum surface.
2. $\vec{N}_2$ = the normal to the plane of the secondary datum surface.

Use a standard CAD algorithm to generate a right-handed orthonormal coordinate system $\vec{i} - \vec{j} - \vec{N}_2$ where the normal $\vec{N}_1$ to the primary plane is in the $\vec{j} - \vec{N}_2$ plane.

$$\vec{N}_1 = (\vec{N}_1 \cdot \vec{j}) \vec{j} + (\vec{N}_1 \cdot \vec{N}_2) \vec{N}_2 \tag{49}$$

Most, but not all of the time, the vector $\vec{N}_1$ will be normal to the vector $\vec{N}_2$ and $(\vec{N}_1 \cdot \vec{N}_2) = 0$ and $\vec{j} = \vec{N}_1$. Eqn. (49) is used as it defines $\vec{j}$ even in those rare cases where the two vectors are not normal.

In this coordinate system the orientation sensitivity vector is:

$$\vec{V}_o = (\vec{V}_o \cdot \vec{i}) \vec{i} + (\vec{V}_o \cdot \vec{j}) \vec{j} + (\vec{V}_o \cdot \vec{N}_2) \vec{N}_2 \tag{50}$$

Since the component $(\vec{V}_o \cdot \vec{N}_2) \vec{N}_2$ depends upon changing the length of the normal vector $\vec{N}_2$, this component cannot contribute to the stack so we replace it with zero. The component $(\vec{V}_1 \cdot \vec{i}) \vec{i}$ merely reacts to rotation of the part's Datum Reference Frame (this surface is a secondary datum), so we replace it with zero. The resulting modified sensitivity coefficient is:

$$\vec{V}_1 = (\vec{V}_o \cdot \vec{j}) \vec{j} \tag{51}$$

The vector $\vec{j}$ in Eqn. (49), Eqn. (50) and Eqn. (51) is $\vec{d}$ related to the vector in Eqn. $\vec{j} = \vec{d}/|\vec{d}|$. (47) and Eqn. (48) by

1.5.5 Planar Tertiary Datum with Planar Secondary and Primary Datums

Since both orientation directions of variation controlled by this datum surface are controlled by the primary and secondary datum surfaces, keep the orientation sensitivity coefficients unchanged. Replace the position sensitivity coefficient with zero. That is, use the position $\vec{K}_1$ sensitivity vector and the orientation sensitivity vector $\vec{V}_1$ in place of the computed vectors $\vec{k}_o$ and $\vec{V}_o$ where:

$$\vec{K}_1 = 0$$

$$\vec{V}_1 = \vec{V}_o \tag{52}$$

1.5.6 Planar Secondary Datum with Perpendicular Primary Axial Datum

See Section § 1.5.2 for pre- and post-processing the sensitivity coefficients for axial datum features.

Since the position direction of variation controlled by a axial datum surface are not also controlled by the planar primary datum surface, we replace the position sensitivity with zero. Since all the orientation direction of variation controlled by a planar datum surface are also controlled by the axial primary datum plane, we keep the orientation sensitivity vector:

$$\vec{K}_1 = 0$$

$$\vec{V}_1 = \vec{V}_o \tag{53}$$

1.5.7 Planar Secondary Datum with Parallel Primary Axial Datum

The remaining direction of variation is translation parallel to the axis of the primary datum surface. All orientation directions of variation are controlled.

The axial primary datum surface controls 2 position directions of variation perpendicular to the axis and 2 orientation directions of variation perpendicular to the axis. The planar secondary surface controls the remaining orientation direction of variation.

Since this planar secondary surface does not control any of the positional directions of variation, we keep the position sensitivity vector $\vec{K}_o$:

$$\vec{K}_1 = \vec{K}_o \tag{54}$$

Write the orientation sensitivity vector $\vec{V}_o$ as:

$$\vec{V}_o = (\vec{V}_o \cdot \vec{N}_1) \vec{N}_1 + (\vec{V}_o \cdot \vec{N}_2) \vec{N}_2 + (\vec{V}_o \cdot \vec{k}) \vec{k} \tag{55}$$

where $\vec{N}_1$ is the direction of the primary axis, $\vec{N}_2$ is normal to the secondary plane, and $\vec{k}$ is such $\vec{N}_1 - \vec{N}_2 - \vec{k}$ that form a right handed orthonormal coordinate system.[1]

[1] Since the secondary plane is parallel to the primary axis, the two vectors $\vec{N}_1$ and $\vec{N}_2$ are already orthonormal.

The primary axial datum surface controls rotation about both $\vec{k}$ the $\vec{N}_2$ and directions, so we want to keep these two components. This secondary planar surface controls rotation about the $\vec{N}_1$ direction, so we replace this component with zero. The resulting sensitivity coefficient is:

$$\vec{V}_1 = \vec{V}_o - (\vec{V}_o \cdot \vec{N}_1)\vec{N}_1 \qquad (56)$$

1.5.8 Axial Surface as Primary Datum

Since there are no directions of variation controlled by this datum surface that are controlled by another datum surface, replace all orientation and position sensitivity coefficients for this surface with zero:

$$\vec{K}_{1P} = 0$$

$$\vec{K}_{1N} = 0 \qquad (57)$$

1.5.9 Axial Secondary Datum with Perpendicular Planar Primary Datum

Since none of the position directions of variation controlled by a axial datum surface are also controlled by the planar primary datum surface, we replace the position sensitivity with zero. Since all the orientation directions of variation controlled by a axial datum surface are also controlled by the planar primary datum plane, we keep the orientation sensitivity vector.

$$\vec{K}_{1P} = 0$$

$$\vec{K}_{1N} = \vec{K}_{0N} \qquad (58)$$

1.5.10 Axial Tertiary Surface with Perpendicular Planar Primary Datum and Parallel Axial Secondary Datum Since only one of the two position directions of variation controlled by a axial datum surface is also controlled by the axial secondary datum surface, we adjust the position sensitivity. Since all the orientation directions of variation controlled by a axial datum surface are also controlled by the primary and secondary datum surfaces, we keep the orientation sensitivity vector.

$$\vec{K}_{1P} = \frac{(\vec{V}_o \cdot \vec{d})}{(\vec{d} \cdot \vec{d})}\vec{d} \qquad (59)$$

$$\vec{K}_{1N} = \vec{K}_{0N}$$

where $$\vec{d} = (\vec{P}_1 - \vec{P}_2) - ((\vec{P}_1 - \vec{P}_2) \cdot \vec{N}_2)\vec{N}_2 \qquad (60)$$

and $\vec{P}_1$ is the position of the secondary axis, $\vec{P}_2$) is the position of this tertiary axis and $\vec{N}_2$ is the normal to the secondary plane. The derivation of those two equations follow below.

Keeping the orientation sensitivity is obvious—the orientation of the Datum Reference Frame for the part will be controlled by the planar primary datum surface.

Being a tertiary datum, there are two position points involved:
1. $\vec{P}_1$ = the position of the axial secondary datum surface.
2. $\vec{P}_2$ = the position of this axial surface.

Use a standard CAD algorithm to generate a right-handed orthonormal coordinate system $\vec{i} - \vec{j} - \vec{N}_2$ where the vector $\vec{N}_2$ is parallel to this axial $\vec{P}_1 - \vec{P}_2$ surface and the vector in the $\vec{j} - \vec{N}_2$ plane.

In this coordinate system the orientation sensitivity vector is:

$$\vec{V}_o = (\vec{V}_o \cdot \vec{i})\vec{i} + (\vec{V}_o \cdot \vec{j})\vec{j} + (\vec{V}_o \cdot \vec{N}_2)\vec{N}_2 \qquad (61)$$

Since the component $$(\vec{V}_o \cdot \vec{N}_2)\vec{N}_2$$

measures the motion parallel to the axis of the axial surface, this component cannot contribute to the stack so we replace it with zero. The component $$(\vec{V}_1 \cdot \vec{i})\vec{i}$$

merely reacts to rotation of the part's Datum Reference Frame (this surface is a tertiary datum), so we replace it with zero. The resulting modified sensitivity coefficient is:

$$\vec{V}_1 = (\vec{V}_o \cdot \vec{j})\vec{j} \qquad (62)$$

The vector j in Eqn. (61) and Eqn. (62) is related to the vector in Eqn. (59) by.

$$\vec{j} = \vec{d} / |\vec{d}|$$

The teachings of all patents, published applications and references cited herein are incorporated by reference in their entirety.

While example embodiments have been particularly shown and described, it will be understood by those skilled in the art that various changes in form and details may be made therein without departing from the scope of the embodiments encompassed by the appended claims.

What is claimed is:

1. In a computer-aided design system, a computer-implemented method comprising:
   providing a model assembly within a simulated environment, the assembly including a plurality of parts;
   identifying user-selected surfaces of the model assembly;
   defining tolerance specifications for each of the user-selected surfaces;
   applying a plurality of constraints to the assembly based on the user-selected surfaces, each of the plurality of constraints defining a relationship between surfaces of at least two of the plurality of parts;
   defining overlay surfaces at the assembly, each of the overlay surfaces corresponding to a respective one of the user-selected surfaces;
   defining a stack based on a user input, the stack being a measurement dimension encompassing at least two of the plurality of parts;
   simulating 1) variation of the overlay surfaces across a range of variation values within a respective tolerance zone based on the tolerance specifications and 2) alteration of the stack as a result of the variation;
   identifying, based on the variation of the overlay surfaces, a subset of the user-selected surfaces that, when varied within the respective tolerance zone, alter the stack; and
   configuring a database to indicate 1) the user-selected surfaces and 2) respective contributor values indicating a relative contribution of each of the user-selected surfaces to the stack.

2. The method of claim 1, wherein each of the overlay surfaces exhibit a position within the assembly equivalent to a position of the respective one of the user-selected surfaces.

3. The method of claim 1, wherein each of the overlay surfaces exhibit a geometry equivalent to a geometry of the respective one of the user-selected surfaces, the geometry including the respective tolerances.

4. The method of claim 1, wherein each of the plurality of constraints define a relationship between at least two of the overlay surfaces.

5. The method of claim 1, wherein each of the overlay surfaces is constrained to at least one other of the overlay surfaces as a function of at least one of the plurality of constraints.

6. The method of claim 1, wherein simulating the variation includes:
generating one of the overlay surfaces for each of the user-selected surfaces;
positioning the overlay surface at the assembly; and
altering at least one of size, position, offset and orientation of the overlay surface.

7. The method of claim 6, wherein the overlay surfaces include a planar surface, and wherein the altering includes altering at least one of offset and orientation of the planar surface.

8. The method of claim 6, wherein the overlay surfaces include a cylindrical surface, and wherein the altering includes altering at least one of size and position of the cylindrical surface.

9. The method of claim 1, further comprising determining a function relating 1) the stack, 2) the user-selected surfaces, 3) the plurality of constraints, and 4) the respective tolerance.

10. The method of claim 1, wherein the user-selected surfaces include at least two surfaces in contact with one another between the at least two of the plurality of parts.

11. The method of claim 1, further comprising configuring the database to indicate a relation between a variation type and the respective contributor value, the variation type including at least one of size, position, offset and orientation.

12. The method of claim 1, further comprising identifying, based on the simulation, a modification to a respective tolerance value that maintains the stack within a threshold range of values.

13. The method of claim 12, further comprising performing an updated simulation based on the modification to the respective tolerance value.

14. The method of claim 13, further comprising modifying the model assembly to incorporate the modification to the respective tolerance value.

15. The method of claim 1, further comprising simulating movement of the assembly through at least one degree of freedom permitted via the plurality of constraints.

16. The method of claim 15, further comprising identifying the subset of the user-selected surfaces based on the movement.

17. The method of claim 1, further comprising applying a datum to at least one of the user-selected surfaces, the datum establishing a reference point for the user-selected surfaces.

18. The method of claim 17, wherein simulating the variation includes expressing the user-selected surfaces as coordinates based on the datum.

19. The method of claim 1, further comprising representing a plurality of surfaces of the assembly with the overlay surfaces.

20. The method of claim 1, wherein each of the overlay surfaces is defined by a mathematical rule encompassing an infinity of points.

21. In a computer-aided design system, a computer-implemented method comprising:
providing a model assembly within a simulated environment, the assembly including a plurality of parts;
identifying user-selected surfaces of the model assembly;
applying a plurality of constraints to the assembly based on the user-selected surfaces, each of the plurality of constraints defining a relationship between surfaces of at least two of the plurality of parts;
applying a user-selected datum to at least one of the user-selected surfaces, the datum establishing a reference point for the user-selected surfaces;
defining a stack based on a user input, the stack being a measurement of a dimension encompassing at least two of the plurality of parts;
simulating 1) variation of the user-selected surfaces across a range of variation values within a respective tolerance, the variation being a function of the datum, and 2) alteration of the stack as a result of the variation;
identifying, based on the variation, a subset of the user-selected surfaces that, when varied within the respective tolerance, alter the stack; and
configuring a database to indicate 1) the user-selected surfaces, 2) the datum, and 3) respective contributor values indicating a relative contribution of each of the user-selected surfaces to the stack.

22. In a computer-aided design system, a computer-implemented method comprising:
providing a model assembly within a simulated environment, the assembly including a plurality of parts;
identifying user-selected surfaces of the model assembly;
defining tolerance specifications for each of the user-selected surfaces;
applying constraints to respective surfaces of the assembly, each of the constraints including a surface definition governing variation of the respective surfaces within respective tolerance limits;
defining overlay surfaces for each of the constraints, each of the overlay surfaces having a geometry defined by the respective surface definition;
defining a stack based on a user input, the stack being a measurement dimension encompassing at least two of the plurality of parts;
simulating 1) variation of the overlay surfaces across a range of variation values within a respective tolerance zone based on the tolerance specifications and 2) alteration of the stack as a result of the variation;
identifying, based on the variation of the overlay surfaces, a subset of the user-selected surfaces that, when varied within the respective tolerance zone, alter the stack; and
configuring a database to indicate 1) the user-selected surfaces and 2) respective contributor values indicating a relative contribution of each of the user-selected surfaces to the stack.

23. The method of claim 22, where the constraint is a parallel constraint between two planes.

24. The method of claim 22, where the constraint is a mating planes constraint between two planes.

25. The method of claim 22, where the constraint is a perpendicular constraint between two planes.

26. The method of claim 22, where the constraint is a tab in slot constraint between four planes.

27. The method of claim 22, where the constraint is a pin in hole constraint between two cylindrical surfaces.

28. The method of claim 22, where the constraint is a virtual bolt constraint between two cylindrical surfaces.

29. The method of claim 22, where the constraint is a compound pin in hole constraint between multiple cylindrical surfaces.

30. The method of claim 22, where the constraint is a point-on-plane constraint between a point and plane.

31. The method of claim 22, where the constraint is a point-on-cylinder constraint between a point and a cylinder.

32. The method of claim 22, where the constraint is a point-coincident-with-point constraint between two points.

33. The method of claim 22, where the constraint is a ball in socket constraint between two spheres.

34. The method of claim 22, where the constraint is a cylinder-tangent-to-plane constraint between a plane and a cylinder.

35. The method of claim 22, where the constraint is a sphere-tangent-to-plane constraint between a plane and a sphere.

36. The method of claim 22, where the constraint is a sphere-tangent-to-cylinder constraint between a cylinder and a sphere.

37. The method of claim 22, where the constraint is a sphere-tangent-to-nurbs-surface constraint between a nurbs surface and a sphere.

38. In a computer-aided design system, a computer-implemented method comprising:

provided a model assembly within a simulated environment, the assembly including a plurality of parts;

identifying user-selected surfaces of the model assembly;

defining tolerance specifications on each of the user selected surfaces;

applying a plurality of constraints to the assembly based on the user-selected surfaces, each of the plurality of constraints defining a relationship between surfaces of at least two of the plurality of parts;

defining overlay surfaces for the respective surfaces of the plurality of constraints, each of the overlay surfaces having a geometry defined by a mathematical rule encompassing an infinity of points, defining at least one stack based on a user input, each stack being a measurement dimension encompassing at least two of the plurality of parts;

simulating 1) variation of the overlay surfaces across a range of variation values within a respective tolerance zone and 2) alteration of the stack as a result of the variation;

identifying, based on the variation of the overlay surfaces, a subset of the user-selected surfaces that, when varied within the respective tolerance zone, alter the stack; and configuring a database to indicate 1) the user-selected surfaces and 2) respective contributor values indicating a relative contribution of each of the user-selected surfaces to the stack.

\* \* \* \* \*